(12) United States Patent
McCormack et al.

(10) Patent No.: US 10,082,995 B2
(45) Date of Patent: Sep. 25, 2018

(54) EHF ENABLED DISPLAY SYSTEMS

(71) Applicant: Keyssa, Inc., Campbell, CA (US)

(72) Inventors: Gary D. McCormack, Tigard, OR (US); Roger D. Isaac, San Jose, CA (US)

(73) Assignee: KEYSSA, INC., Campbell, CA (US)

( * ) Notice: Subject to any disclaimer, the term of this patent is extended or adjusted under 35 U.S.C. 154(b) by 0 days.

(21) Appl. No.: 15/642,986

(22) Filed: Jul. 6, 2017

(65) Prior Publication Data
US 2017/0300279 A1    Oct. 19, 2017

Related U.S. Application Data

(63) Continuation of application No. 15/357,513, filed on Nov. 21, 2016, now Pat. No. 9,740,448, which is a
(Continued)

(51) Int. Cl.
*G06F 1/16* (2006.01)
*G06F 3/14* (2006.01)
(Continued)

(52) U.S. Cl.
CPC .............. *G06F 3/14* (2013.01); *G06F 1/1681* (2013.01); *G06F 1/1698* (2013.01); *G06F 13/00* (2013.01);
(Continued)

(58) Field of Classification Search
CPC .... G06F 1/1654; G06F 1/1656; G06F 1/1675; G06F 1/1681; G06F 1/1683
See application file for complete search history.

(56) References Cited

U.S. PATENT DOCUMENTS 5,021,759 A    6/1991   Gamand et al.
6,252,767 B1   6/2001   Carlson
(Continued)

FOREIGN PATENT DOCUMENTS

CN    102195111 A    9/2011
EP      2434576 B1    3/2012
(Continued)

OTHER PUBLICATIONS

ECMA Standard: "Standard ECMA-398: Close Proximity Electric Induction Wireless Communications." Jun. 2011, pp. 1-99, http://www.ecma-international.org/publications/standards/Ecma-398.htm.
(Continued)

*Primary Examiner* — Anthony Q Edwards
(74) *Attorney, Agent, or Firm* — Van Court & Aldridge LLP

(57) ABSTRACT

Display systems that use contactless connectors for transmitting data are provided. The contactless connectors are electromagnetic connectors that form an electromagnetic communications link. The electromagnetic communications link can be established within different locations of the same device, or between two different devices. The communications link can be established using at least two transceivers. The transceivers can be incorporated in different enclosures that are hinged together, or the transceivers can be incorporated within a hinge that enables two enclosures to move with respect to each other. A transceiver can be incorporated into a display device that can receive data from an active surface that has a transceiver. When the display device is placed on the active surface, the display device may serve as an access point to content contained within the active surface.

16 Claims, 24 Drawing Sheets

Related U.S. Application Data continuation of application No. 13/963,888, filed on Aug. 9, 2013, now Pat. No. 9,529,737, which is a continuation-in-part of application No. 13/963,199, filed on Aug. 9, 2013, now Pat. No. 9,515,365, and a continuation-in-part of application No. 13/760,089, filed on Feb. 6, 2013, now Pat. No. 9,191,263, and a continuation-in-part of application No. 13/776,727, filed on Feb. 26, 2013, now Pat. No. 9,219,956, and a continuation-in-part of application No. 13/848,735, filed on Mar. 22, 2013.

(60) Provisional application No. 61/799,593, filed on Mar. 15, 2013, provisional application No. 61/799,510, filed on Mar. 15, 2013, provisional application No. 61/738,297, filed on Dec. 17, 2012, provisional application No. 61/681,792, filed on Aug. 10, 2012.

(51) Int. Cl.

| | | |
|---|---|---|
| *G06F 13/00* | (2006.01) | |
| *G09G 5/00* | (2006.01) | |
| *G06F 13/42* | (2006.01) | |
| *H01P 3/127* | (2006.01) | |
| *H02J 50/10* | (2016.01) | |
| *H02J 50/80* | (2016.01) | |
| *G06F 3/0488* | (2013.01) | |
| *G06F 3/0481* | (2013.01) | |

(52) U.S. Cl.
CPC ............ *G06F 13/42* (2013.01); *G09G 5/006* (2013.01); *H01P 3/127* (2013.01); *H02J 50/10* (2016.02); *H02J 50/80* (2016.02); *G06F 3/0481* (2013.01); *G06F 3/0488* (2013.01); *G09G 2330/021* (2013.01); *G09G 2370/16* (2013.01)

(56) References Cited

U.S. PATENT DOCUMENTS

| | | |
|---|---|---|
| 2005/0162338 A1 | 7/2005 | Ikeda et al. |
| 2006/0082518 A1 | 4/2006 | Ram |
| 2006/0232483 A1 | 10/2006 | Iwai et al. |
| 2008/0055303 A1 | 3/2008 | Ikeda |
| 2009/0273560 A1 | 11/2009 | Kalanithi et al. |
| 2010/0159829 A1 | 6/2010 | McCormack |
| 2010/0167645 A1 | 7/2010 | Kawashimo |
| 2010/0265648 A1 | 10/2010 | Hirabayashi |
| 2012/0072620 A1* | 3/2012 | Jeong .................... G06F 1/1654 710/29 |
| 2012/0093041 A1 | 4/2012 | Takeda et al. |
| 2013/0063873 A1* | 3/2013 | Wodrich ............... G06F 1/1635 361/679.01 |
| 2013/0080663 A1 | 3/2013 | Rabii et al. |
| 2013/0229362 A1 | 9/2013 | Liu et al. |
| 2014/0043745 A1* | 2/2014 | McCormack ........... G06F 13/00 361/679.09 |

FOREIGN PATENT DOCUMENTS

| | | |
|---|---|---|
| EP | 2479843 | 7/2012 |
| JP | 2008-252566 A | 10/2008 |
| WO | 2005/069585 A1 | 7/2005 |
| WO | 2014/130146 A1 | 8/2014 |

OTHER PUBLICATIONS

Wireless HD™: "WirelessHD Specification Version 1.1 Overview." May 2010, pp. 1-95, http://www.wirelesshd.org/pdfs/WirelessHD-Specification-Overview-v1.1May2010.pdf.

* cited by examiner

EHF ENABLED DISPLAY SYSTEMS

CROSS-REFERENCE TO RELATED APPLICATIONS

This patent application is a continuation of U.S. patent application Ser. No. 15/357,513, filed Nov. 21, 2016, which is a continuation of U.S. patent application Ser. No. 13/963,888, filed Aug. 9, 2013 (now U.S. Pat. No. 9,529,737), which claims the benefit of the following U.S. Provisional Patent Application Nos.: 61/681,792, filed Aug. 10, 2012; 61/738,297, filed Dec. 17, 2012; 61/799,510, filed Mar. 15, 2013; and 61/799,593, filed Mar. 15, 2013. U.S. patent application Ser. No. 13/963,888 is a continuation-in-part of the following U.S. patent application Ser. No. 13/963,199, filed Aug. 9, 2013 (now U.S. Pat. No. 9,515,365); Ser. No. 13/760,089, filed Feb. 6, 2013 (now U.S. Pat. No. 9,191,263); Ser. No. 13/776,727, filed Feb. 26, 2013 (now U.S. Pat. No. 9,219,956); and Ser. No. 13/848,735, filed Mar. 22, 2013. Each of the aforementioned disclosures is incorporated by reference in its entirety.

TECHNICAL FIELD

This patent specification relates to display systems. More particularly, this patent specification relates to display systems that use contactless data transmission circuitry.

BACKGROUND

Conventional displays typically require a hard-wired connection to display data. This may be especially true for high-resolution displays that display data at full uncompressed resolutions. Examples of hard-wired connections include HDMI, DisplayPort, DVI, and MHL. Such hard-wired connections can impose several design constraints or can be subject to physical wear and tear. For example, the mechanical and physical limitations of connectors connecting one device (e.g., set-top box or computing device) to another device (e.g., display) can limit the speed of connection between the two devices. As another example, the form factor of the connector can dictate the design of the device (e.g., display). As a specific example, the dimensions of the connector can be a limiting factor in the size of an electronic device's housing. As yet another example, for laptop devices, the mechanical hinge can present issues in routing signals from a processing board to a display. The issues can be manifested in terms of signal integrity, bandwidth, and mechanical durability. Moreover, devices that use rotatable displays and/or removable displays may subject to some of the same issues as the experienced by laptop devices.

Accordingly, display systems that eliminate problems of conventional display connectors are needed.

SUMMARY

Display systems that use contactless connectors for transmitting data are provided. The contactless connectors are electromagnetic connectors that form an electromagnetic communications link. The electromagnetic communications link can be established within different locations of the same device, or between two different devices. In either approach, transceivers may be used to convert electrical signals to electromagnetic (EM) signals. One transceiver may convert electrical signals to EM signals that are received by another transceiver that converts the EM signals to electrical signals. These two transceivers can form a point-to-point contactless communication link, sometimes referred to herein as a coupled-pair, that requires no physical wired connection to transmit data from one location to another. The transceivers can be extremely high frequency (EHF) transceivers.

One or more of the coupled pairs of transceivers can be incorporated into or in close proximity of a hinge that enables two enclosures of an electronic device to move with respect to each other. For example, in one embodiment a system can include a first enclosure that includes a display and a first extremely high frequency (EHF) transceiver, and a second enclosure that includes a second EHF transceiver. The first and second enclosure can be movably coupled together by at least one hinge, wherein the first enclosure can move with respect to the second enclosure according to a predetermined range of motion. A close proximity coupling ("CPC") can exists between the first and second EHF transceivers to enable contactless data transfer between the first and second enclosures regardless of a position of the first enclosure with respect to the second enclosure.

In other embodiment, an extremely high frequency (EHF) waveguide hinge can incorporate at least one coupled pair of transceivers and a waveguide. In particular, the hinge can include a first hinge member having a first waveguide member and a first EHF transceiver, wherein the first waveguide member at least partially encompasses the first EHF transceiver, and a second hinge member having a second waveguide member and a second EHF transceiver, wherein the second waveguide member at least partially encompasses the second EHF transceiver. The first and second hinge members can be coupled together via the first and second waveguide members and a close proximity coupling can exist between the first and second EHF transceivers to enable contactless data transfer between the first and second hinge members regardless of a position of the first hinge member with respect to the second hinge member. The first and second waveguide members assist in preserving the close proximity coupling. In particular, the waveguide members can further promote a dielectric coupling of the electromagnetic link formed between each coupled-pair.

The display systems according to various embodiments can include a self-contained, highly portable, EHF enabled display apparatus that is operable to receive data from an "active surface" via a close proximity coupling that exists between the EHF enabled display apparatus and the active surface, and that processes the data for presentation on the EHF enabled display. The EHF enabled display apparatus can be a relatively simple device that includes a display, a display controller, and EHF transceivers, and optionally can include input circuitry such as touch sensors. The active surface may be an apparatus that can provide data, including display data, to the EHF enabled display apparatus via EHF transceivers. In addition, the active surface may have limited input capabilities, and may be devoid of a display. In some embodiments, the EHF enabled display apparatus can serve as a user interface to a device—the active surface—that does not have a user interface. In effect, it serves as a gateway or window to content contained and generated by the active surface without needing the circuitry or resources necessary for independently generating and presenting such content itself.

The content supplied by the active surface may vary depending on any suitable number of factors. For example, different active surfaces may provide different content. As another example, different EHF enabled display devices being used on the same active surface may be presented with different data based on different access privileges. As a specific example, a first user may be presented with a first level of data, whereas a second user may be presented with a second level of data.

The EHF enabled display can function as an access point for enabling a user to access content stored in the active surface apparatus, for authenticating a user of the EHF enabled display to the active surface apparatus, or for conducting a secured transaction. In some embodiments, the EHF enabled display can be used for two-factor authentication. Input circuitry contained within the EHF enabled display apparatus can, for example, process pin codes, finger prints, facial recognition, or retina recognition as an authentication factor.

In some embodiments, the EHF enabled display apparatus may only be operative when it is placed in close proximity of an active surface. Thus, when it is not in proximity of the active surface, the EHF display apparatus may be a non-functional, inert device. However, when the EHF display apparatus is placed on the active surface, a close proximity coupling can be established that enables the active surface to provide data to the display apparatus. The EHF display apparatus can then display the information. In some embodiments, the EHF display apparatus can simply function as a display of content sourced by the active surface. In other embodiments, the EHF display apparatus can enable a user to interact with content sourced by the active surface by processing input commands (e.g., touch-screen inputs, finger recognition, etc.) and provide those inputs to the active surface.

A further understanding of the nature and advantages of the embodiments discussed herein may be realized by reference to the remaining portions of the specification and the drawings.

DETAILED DESCRIPTION OF THE DISCLOSURE

Figure 1A:
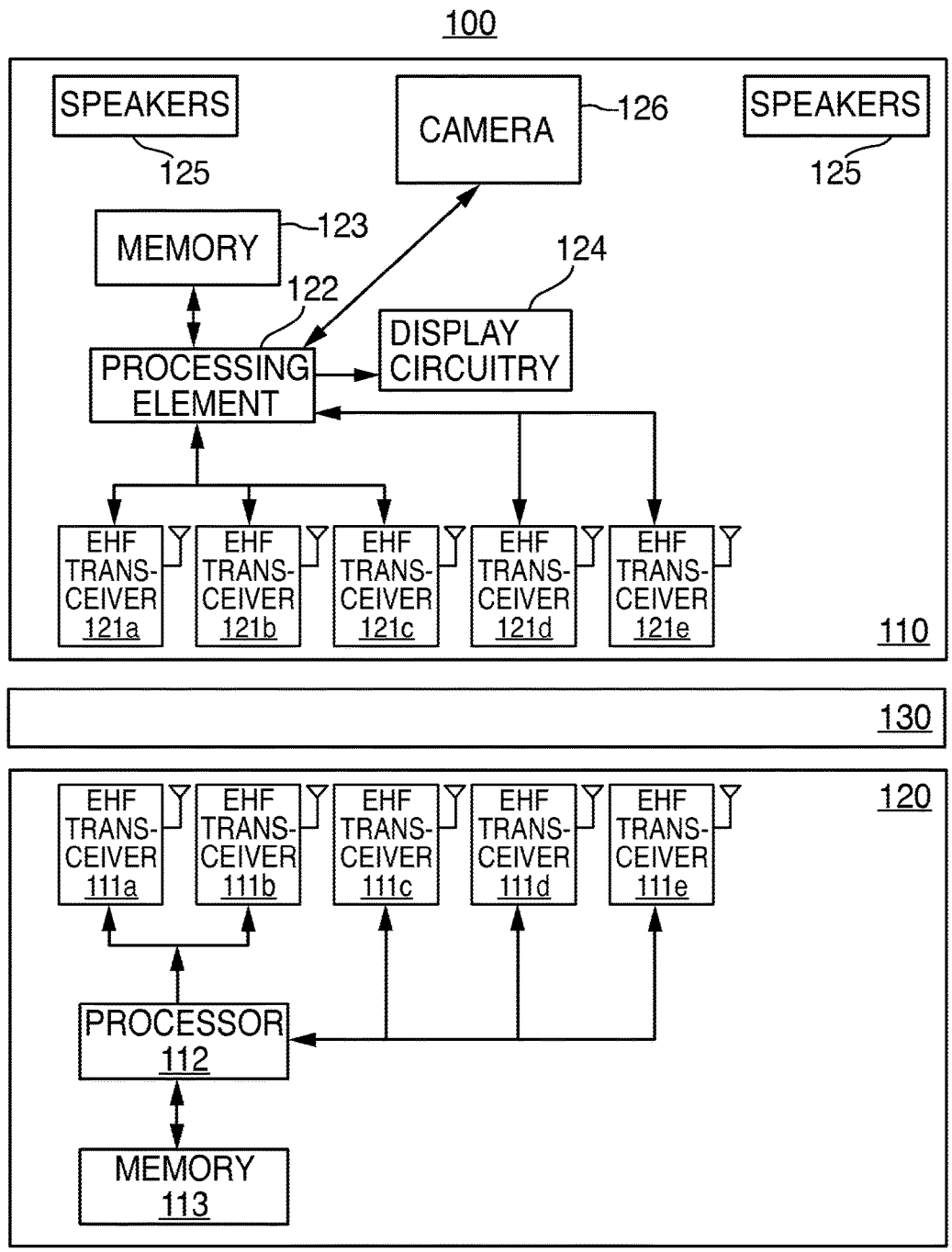
FIG. 1A shows an illustrative schematic diagram of an electronic device, according to some embodiments.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

The acronym "EHF" stands for Extremely High Frequency, and refers to a portion of the electromagnetic (EM) spectrum in the range of 30 GHz to 300 GHz (gigahertz). The term "transceiver" may refer to a device such as an IC (integrated circuit) including a transmitter (Tx) and a receiver (Rx) so that the integrated circuit may be used to both transmit and receive information (data). Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic (EM) rather than electrical (wired, contact-based) connections and transport of signals between entities (such as devices). As used herein, the term "contactless" may refer to a carrier-assisted, dielectric coupling system which may have an optimal range in the zero to five centimeter range. The connection may be validated by proximity of one device to a second device. Multiple contactless transmitters and receivers may occupy a small space. A contactless link established with electromagnetics (EM) may be point-to point in contrast with a wireless link which typically broadcasts to several points.

It is to be appreciated that while one or more EHF frequency embodiments are described further herein in the context of being used in an EHF enabled display device, a laptop computer or a tablet, the scope of the present teachings is not so limited. More generally, the EHF frequency embodiments are applicable to a wide variety of devices that use one or more hinges of various designs, including, for example, pivot, swivel, detachable, or a combination thereof. Further, it is understood that while terms such as user, and the like may be used to refer to the person or persons who are interacting with the hinge in the context of one or more scenarios described herein, these references are by no means to be considered as limiting the scope of the present teachings with respect to the person or persons who are performing such actions.

The RF energy output by the EHF transceivers described herein may be below FCC requirements for certification or for transmitting an identification (ID) code which would otherwise interrupt data flow during the data transfer. Reference is made to 47 CFR § 15.255 (Operation within the 57-64 GHz), which is incorporated by reference herein. The RF energy output can be controlled such that there is no need to beacon. The energy output can be controlled using, for example, metal and/or plastic shielding.

FIG. 1A shows an illustrative schematic diagram of electronic device 100 according to an embodiment. Device 100 can include enclosure 110, enclosure 120, and hinge 130. Enclosures 110 and 120 can be movably or detachably coupled together via hinge 130 and can move with respect to each other and/or be detached from each other. Enclosures 110 and 120 can each include various circuitries. For example, as shown, enclosure 110 can include EHF transceivers 111a-e, processor 112, memory 113, and other circuitry (not shown). Enclosure 120 can include EHF transceivers 121a-e, processing element 122, memory 123, display circuitry 124, speakers 125, camera 126, and other circuitry (not shown). In embodiments where device 100 is a laptop type of device, enclosure 110 can include the keyboard portion of the laptop and enclosure 120 can include the display portion of the laptop.

During operation of device 100, data can be transmitted between enclosures 110 and 120 via EHF transceivers 111a-e and 121a-e. Each of transceivers 111a-e (of enclosure 110) can be close proximity coupled to a respective one of EHF transceivers 121a-e (of enclosure 120). For example, EHF transceivers 111a and 121a can be contactlessly coupled together, EHF transceivers 111b and 121b can be contactlessly coupled together, and so on. Each EHF transceiver pair coupling can provide a contactless data pathway, conduit, or channel. In some embodiments, the data conduits can be one-way (e.g., data flows from enclosure 110 to enclosure 120 via a particular conduit) or two-way (e.g., data flows bi-directionally between enclosures 110 and 120 via a particular conduit). In some embodiments, device 100 can have a predetermined number of dedicated one-way conduits for carrying data from enclosure 110 to enclosure 120 and a predetermined number of dedicated one-way conduits for carrying data from enclosure 120 to enclosure 110. For example, a dedicated one-way conduit can carry graphics data generated within enclosure 110 for display on enclosure 120 and another dedicated one-way conduit can carry image data generated by camera 126 within enclosure 120 for use by circuitry contained in enclosure 110. In other embodiments, device 100 can include one or more two-way conduits. In yet another embodiment, device 100 can include a combination of one-way and two-way conduits. As illustrated in FIG. 1A, each of the EHF contactless couplings can be single conduit couplings in which only one data path exists for each coupling. This is merely illustrative, and it is understood that an EHF contactless coupling can include multiple conduits.

Figure 1B:
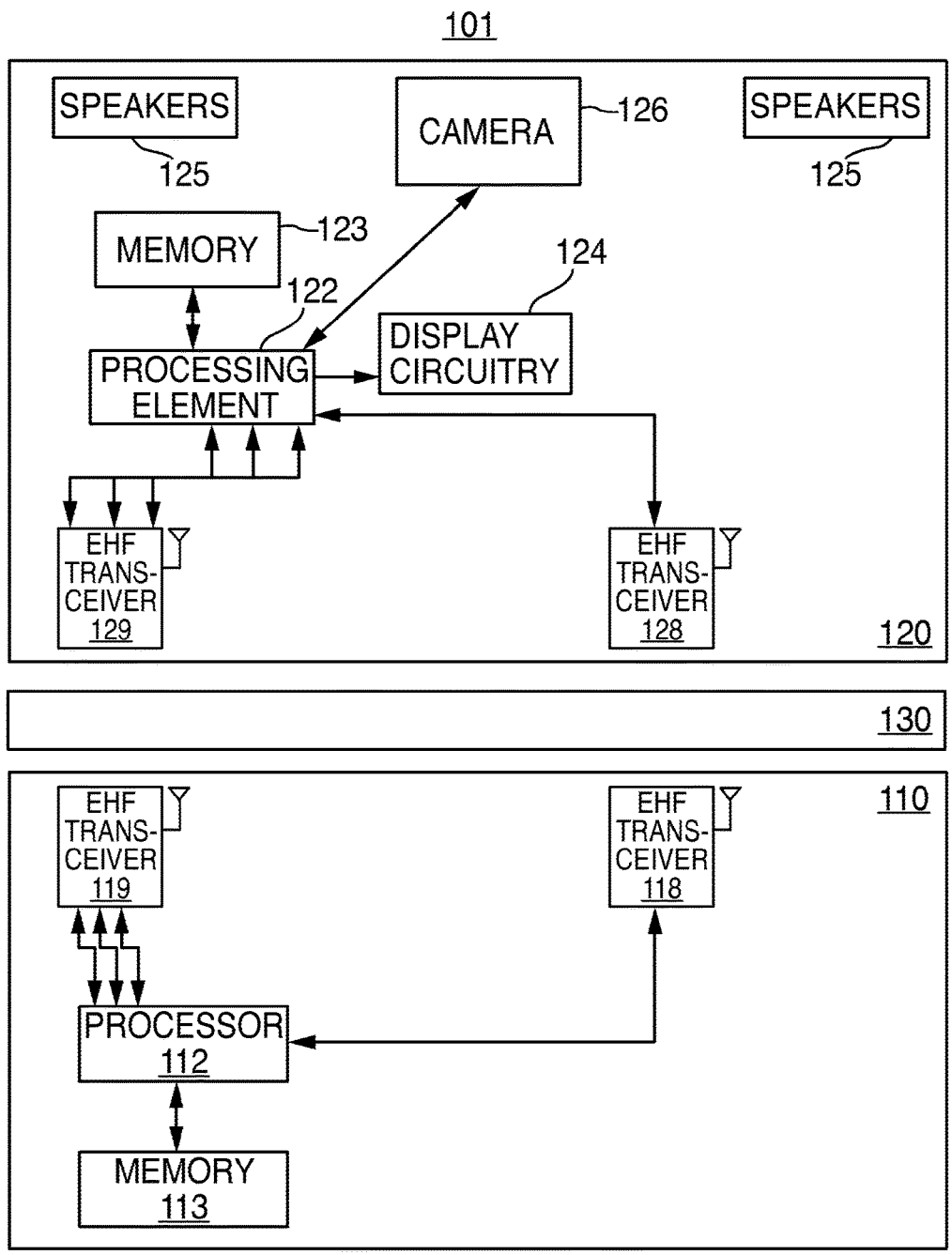
FIG. 1B shows an illustrative schematic diagram of another electronic device, according to some embodiments.

FIG. 1B shows illustrative electronic device 101 having a multiple conduit EHF contactless coupling. In particular, EHF transceiver 119 (of enclosure 110) can form a multiple conduit contactless coupling with EHF transceiver 129 (of enclosure 120). A multiple conduit contactless coupling can transmit a greater amount of data than a single conduit contactless coupling. Device 101 can also include EHF transceivers 118 and 128, which can form a single conduit contactless coupling.

An advantage of using the EHF contactless couplings for enabling data transfer between enclosures is that this contactless coupling replaces physical mediums conventionally used to transfer data. Such physical mediums can include, for example, wires, flexible printed circuit boards, and connectors. Since physical mediums can be bent or subject to various forces during use of conventional devices constructed with such mediums (e.g., repeated opening and closing of a laptop), the physical mediums can fail. In a laptop example, a failed physical medium can render the display useless when the pathway that carries display data is severed. The EHF contactless couplings used in embodiments discussed herein are not subject to the same mechanical failure issues because the data is transmitted via close proximity coupling. However, the absence of a physical transmission medium can introduce a different type of connectivity issue—an issue for ensuring that data is contactlessly transmitted and received regardless of the position of one enclosure with respect to the other.

Figure 2A:
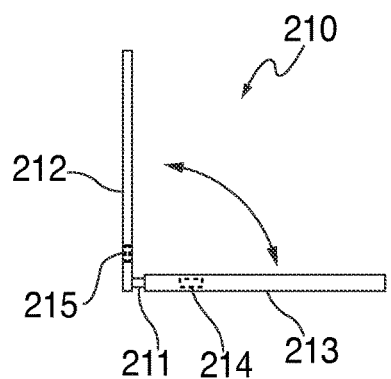
FIGS. 2A-2C show several different electronic devices that use different hinges, according to some embodiments.
Figure 2B:
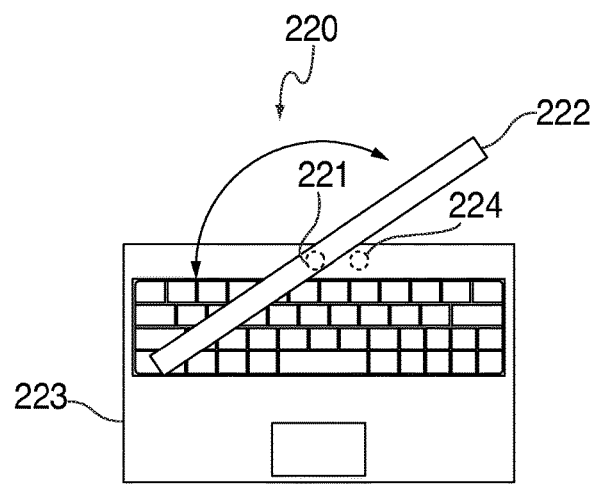
Figure 2C:
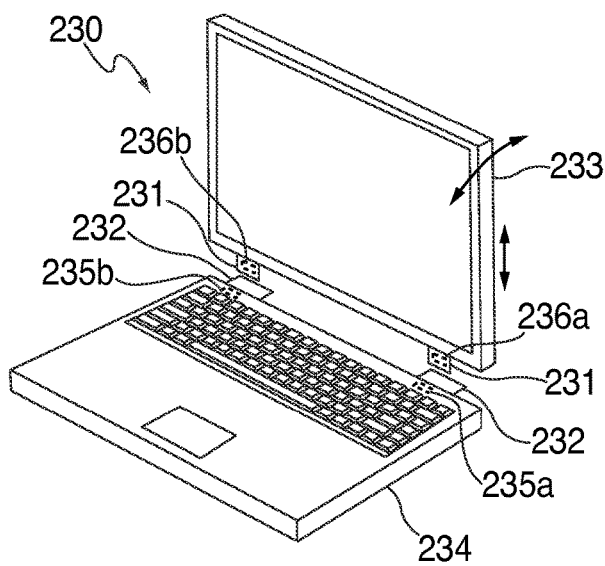

Thus, depending on the type of hinge 130, enclosures 110 and 120 can move in all sorts of directions with respect to each other. For example, FIGS. 2A-2C shows several different electronic devices that use different hinges according to various embodiments. In particular, FIG. 2A shows device 210 that has one or more pivot hinges 211 that can enable enclosure 212 to pivot with respect to enclosure 213. As shown, EHF transceiver 214 may be incorporated into enclosure 213 and EHF transceiver 215 may be incorporated into enclosure 212. Alternatively, one or both of EHF transceivers 214 and 215 may be incorporated into hinge 211. Device 200 can, for example, be a laptop computer.

FIG. 2B shows illustrative device 220 having rotation hinge 221 that can enable enclosure 222 to rotate or swivel with respect to enclosure 223. In some embodiments, rotation hinge 221 may also pivot, thereby enabling enclosure 222 to pivot and rotate with respect to enclosure 223. For example, the enclosure 222 can be pivoted down on top of enclosure 223 such that the display side is facing down, or it can be rotated and pivoted down on top of enclosure 223 so that the display side is facing up. If desired, in some embodiments, enclosure 222 can be removed from enclosure 223. In some embodiments, EHF transceiver 224 may be incorporated into enclosure 223 and another EHF transceiver (not shown) may be incorporated in hinge 221.

FIG. 2C shows illustrative device 230 having detachable hinges that enable enclosure 233 to be detachably removed from enclosure 234. Enclosure 233 may include hinge portions 231 that interface with hinge portions 232 of enclosure 234. In some embodiments, when enclosure 233 is mated with enclosure 234, via hinge portions 231 and 232, the combined hinge may enable the enclosure to move with respect to each other, for example, in a manner similar as to how the hinges of device 210 or device 220 can move. As shown, EHF transceivers 235a and 235b may be incorporated into enclosure 234, and EHF transceivers 236a and 236b may be incorporated into hinge portions 231. It is understood that the placement of the EHF transceivers is illustrative, and that the EHF transceivers may be placed in other locations within enclosures 233 and 234 or within hinge portions 231 and 231.

Figure 2D:
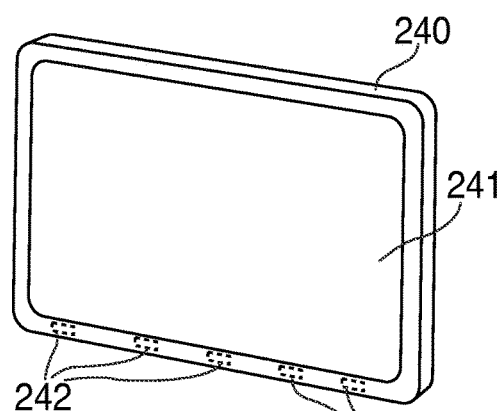
FIG. 2D shows an illustrative view of a tablet, according to some embodiments.
Figure 2E:
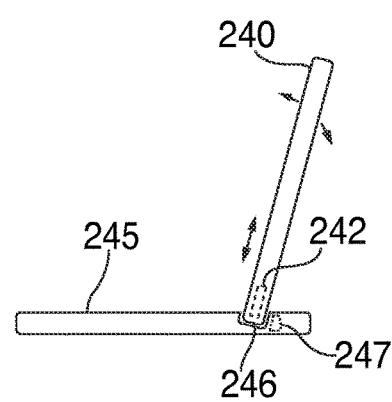
FIGS. 2E-2G show several illustrative views of a tablet interfacing with a docking station, according to some embodiments.
Figure 2F:
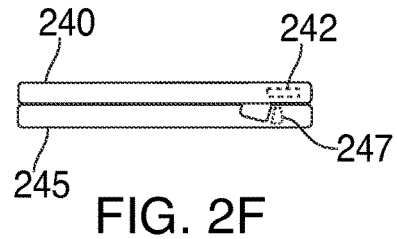
Figure 2G:
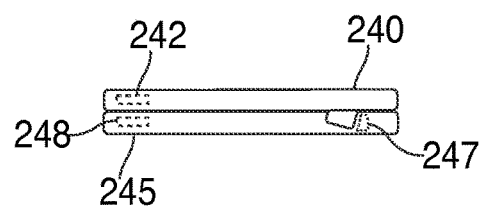

FIG. 2D shows an illustrative view of a tablet and FIGS. 2E-2G show several illustrative views of a tablet interfacing with a docking station, according to various embodiments. Tablet 240 may include interactive display 241 for simultaneously displaying information and processing inputs (e.g., via stylus or one or more fingers). Tablet 240 may also include EHF transceivers 242 for contactlessly transmitting and/or receiving data from another device. FIGS. 2E-2G shows that this other device can be docking station 245. Docking station 245 can be any suitable device for communicating data to and/or receiving data from tablet 240. In one embodiment, docketing station 245 can be an input device such as a keyboard. Docking station 245 can include slot 246 for receiving and holding tablet 240 in place, as shown in FIG. 2E. If desired, slot 246 may enable tablet 240 to pivot. In addition, docking station 245 can include EHF transceivers 247 (only one of which is shown), which may form a close proximity communication link with EHF transceiver 242 when tablet 240 is placed in close proximity of docking station 245. FIG. 2F shows that tablet 240 may be secured to docking station 245 in a face down position (e.g., so that the tablet and docking station can be stowed away). FIG. 2G shows that tablet 240 may be secured to docking station 245 in a face up position (e.g., so that a user can interact with the tablet even though the input function the docking station is not accessible). In this configuration, EHF transceivers 242 may communicate with one or more of EHF transceivers 248, which are distributed along a different portion of docking station 245.

Regardless of the position of one enclosure with respect to the other, the close proximity coupling formed between two EHF transceivers is preferably preserved. In some embodiments, the close proximity coupling can be preserved by aligning respective pairs of EHF transceivers on different portions of the hinge. In these embodiments, the close proximity coupling can be maintained by ensuring that a physical separation between each coupled pair does not exceed a threshold throughout the hinge's entire range of motion. This limitation on physical separation may be particularly suitable for devices that have a clamshell pivot action (e.g., device 210 of FIG. 2). In addition, the spacing between adjacent EHF transceivers may also need to be fixed at a minimum distance to ensure that a coupled pair of EHF transceivers does not interfere with another coupled pair of EHF transceivers.

Figure 2H:
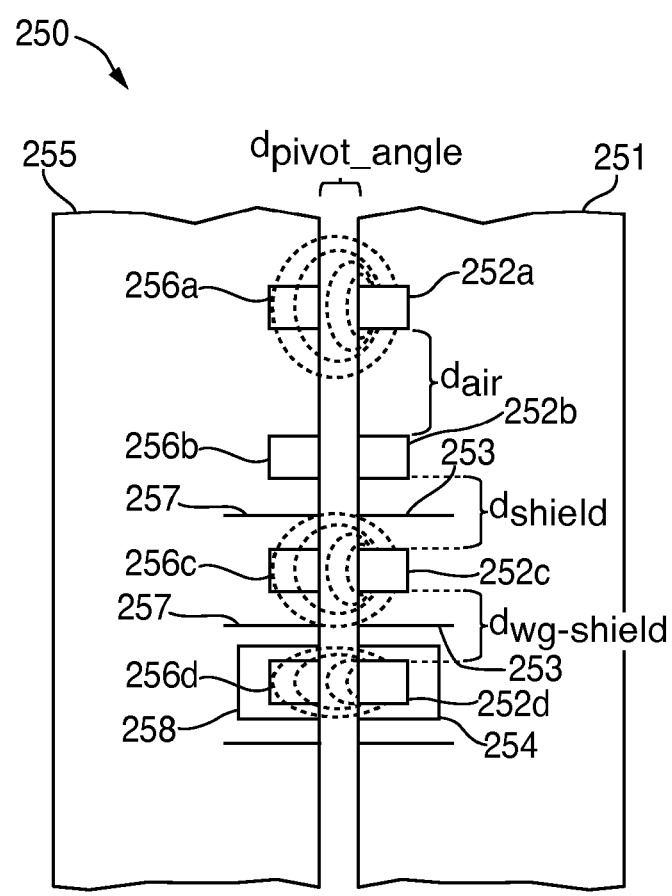
FIG. 2H shows an illustrative top view of a portion of a hinge, according to some embodiments.

FIG. 2H shows an illustrative top view of a portion of hinge 250 with several coupled pairs of EHF transceivers, according to various embodiments. The actual hinge portions that enable a pivot and/or rotation motion are not shown to assist in clearly illustrating spacing requirements within and among coupled pairs of EHF transceivers. Hinge 250 can include hinge member 251, which has EHF transceivers 252a-252d mounted thereon, and hinge member 255, which has EHF transceivers 256a-256d mounted thereon. Transceivers 252a and 256a may form a coupled pair, transceivers 252b and 256b may form a coupled pair, and so on. Each transceiver is shown to be located on an edge of either hinge member 251 or hinge member 255. The gap or distance between members 251 and 255 can be defined by $d_{pivot\_angle}$, where $d_{pivot\_angle}$ can depend on the angle at which one hinge member is moved relative to another hinge member. For example, in a butterfly pivot-type of hinge, $d_{pivot\_angle}$ may be greatest when the hinges are 180 degrees apart and $d_{pivot\_angle}$ may be shortest when the hinges are 90 degrees apart.

The distance $d_{pivot\_angle}$ preferably does not exceed a predetermined threshold so that close proximity coupling signals emanating from one transceiver (e.g., transceiver 252a) can traverse the gap between the coupled pair of transceivers (e.g., transceivers 252a and 256a) and be received by its coupled pair transceiver (e.g., transceiver 256a) without interfering with any other coupled pair of transceivers (e.g., transceivers 252a and 256a). The close proximity coupling signals are shown emanating from transceivers 252a, 252c, and 252d, though it is understood that any transceiver can emit close proximity coupling signals and receive close proximity coupling signals. Additional details on how transceivers emit and receive contactless signals can be found, for example, in commonly owned, co-pending U.S. Publication No. 2012/0263244, the disclosure of which is incorporated by reference herein in its entirety.

In order to prevent cross-talk among adjacent coupled pairs, the distance between adjacent pairs preferably exceeds a minimum distance. Cross-talk can be a potential issue when each coupled pair is operating on the same carrier frequency. It may not be practical to have each coupled pair operate on different carrier frequencies due to regulatory requirements. Another reason it may not be practical to use different carrier frequencies for each coupled pair may be because a relatively large number of coupled pairs are being used (e.g., such as 10, 20, or 100 pairs). Considering, for example, coupled pairs formed by transceivers 252a and 256a, and transceivers 252b and 256b, the distance between the coupled pairs is defined by $d_{air}$. This distance, $d_{air}$, may be the minimum distance required to avoid cross-talk for the entire potential range of distances of $d_{pivot\_angle}$ when the primary medium separating the coupled pairs is air. That is, there is no shielding (such as shield members 253 and 257) disposed between adjacent coupled pairs or waveguides (such as waveguides 254 or 258) to focus direction of contactless signals emanating from one transceiver to another. Thus, in the "only air" embodiments, $d_{air}$ must be greater than $d_{pivot\_angle}$. In some embodiments, $d_{air}$ may be twice the distance of $d_{pivot\_angle}$.

The addition of shield members 253 and 257 can enable the distance between adjacent EHF transceivers on the same board to be reduced, at least relative to the distance of the "air only" embodiment. For example, in "shield embodiments" the distance can be defined by $d_{shield}$. The distance, $d_{shield}$, can be less than $d_{air}$. The distance, $d_{shield}$, can be greater than, equal to, or less than $d_{pivot\_angle}$, depending on a variety of factors, with one factor being the effectiveness of the shielding. The more effective the shielding, then the probability that $d_{shield}$ can be less than $d_{pivot\_angle}$ increases.

The further addition of waveguides 254 and 258 in combination with shield members 253 and 257 may enable the distance between adjacent couple pairs to be further reduced, at least relative to the "air only" and "shield" embodiments. For example, in "waveguide and shield"

embodiments, the distance can be defined by $d_{wg\_shield}$. The distance, $d_{wg\_shield}$, can be less than $d_{air}$ and $d_{shield}$. The distance, $d_{wg\_shield}$, can be greater than, equal to, or less than $d_{pivot\_angle}$, depending on a variety of factors. The factors can include effectiveness of the shielding and the waveguide.

The distance between coupled pairs of EHF transceivers is referred to herein as working distance. This is the distance signals must travel from one EHF transceiver to another EHF transceiver in the point-to-point contactless communication. The working distance can be analogous to the distance $d_{pivot\_angle}$. The distance between adjacent EHF transceivers on the same board is referred to herein as separation distance. The separation distance can be analogous to $d_{air}$, $d_{shield}$, and $d_{wg\_shield}$. The relationship between working distance and separation distance can vary based on many different parameters including, for example, the carrier frequency of the EHF transceivers, the power being supplied to the EHF transceivers, whether air is the dielectric between coupled pairs of transceivers, whether a dielectric coupling member physically couples the coupled pair of transceivers, whether air is the only medium between adjacent EHF transceivers, whether a shielding member is used in between adjacent EHF transceivers, or whether waveguides are used. For example, the use of a dielectric coupling member (discussed below) that physically couples a coupled pair of transceivers can enable the working distance to far exceed the separation distance.

The use of multiple adjacent EHF transceivers on same board may be possible because the EHF transceivers operate at frequency ranges of 30 Gigahertz or 60 Gigahertz or more. This enables the separation distance between immediately adjacent EHF transceivers to be less than 10 centimeters, less than 8 centimeters, less than 5 centimeters, less than 4 centimeters, or less than 3 centimeters, less than 2 centimeters, less than 1 centimeter, less than 9 millimeters, less than 8 millimeters, less than 7 millimeters, less than 6 millimeters, or about 5 millimeters. Embodiments devoid of a dielectric coupling medium that rely only on air as the separation medium may have a greater separation distance than embodiments that use shielding and/or waveguides.

Although not specifically shown in FIG. 2H, a waveguide embodiment can exist in which no shield members are present. In such an embodiment, the use of the waveguide can help reduce the distance needed between coupled pairs of transceivers in order to prevent cross-talk even though no shield member is present.

Figure 2I:
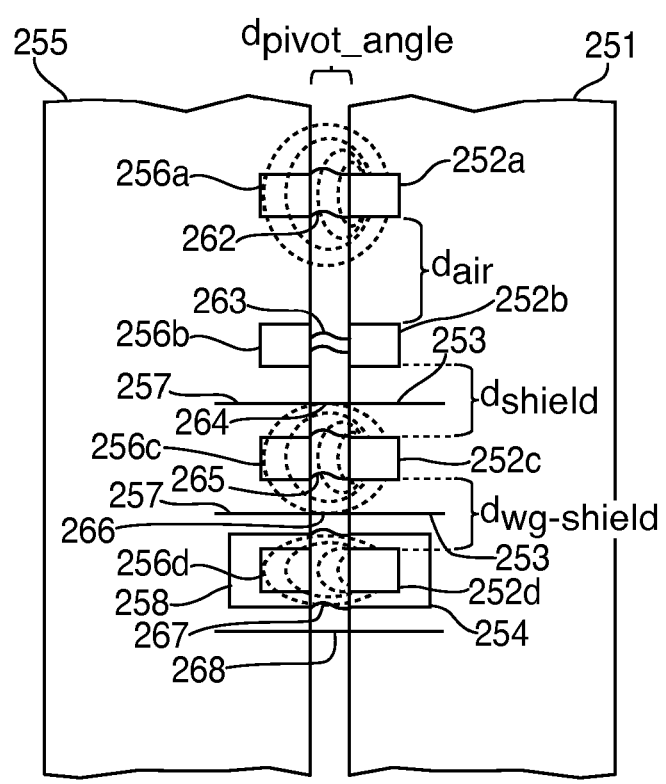
FIG. 2I shows an illustrative top view of a portion of another hinge with several dielectric coupling members, according to various embodiments.

FIG. 2I shows an illustrative top view of a portion of hinge 270 with several coupled pairs of EHF transceivers, according to various embodiments. Hinge 270 is similar in many respects to hinge 250 of FIG. 2H, except in hinge 270, many different dielectric coupling members exist between coupled pairs of EHF transceivers. The actual hinge portions that enable a pivot and/or rotation motion are not shown. The dielectric coupling members can assist in maintaining contactless communication between coupled pairs of EHF transceivers, and can further ensure that contactless communication is maintained throughout the entire range of motion of hinge 270. The dielectric members can take any shape and construction. For example, in some embodiments, the dielectric members can be flexible so that they move in conjunction with the moving hinge members. In other embodiments, the dielectric members can be rigid. Rigid dielectric members may abut waveguide members of each hinge member to ensure the contactless coupling is maintained through a hinge's range of motion. The material composition of the dielectric coupling members can include one more plastics, or a combination of plastic(s) and metal(s). Plastic(s) only constructions may rely on air to isolate one dielectric coupling member from another. Plastic(s) and metal(s) constructions may use metal to isolate one dielectric coupling member from another.

Dielectric coupling member 262 may be a flexible structure that connects EHF transceivers 252a and 256a to each other. Similarly, dielectric coupling member 263 may be another flexible structure that connects EHF transceivers 252b and 256b to each other. Dielectric coupling members 262 and 263 may be discrete components that are not connected to each other, and in which air can serve as the isolating medium. The dimensions of dielectric coupling members 262 and 263 can take any suitable shape. For example, coupling member 262 can have a width that is approximately the same width of EHF transceivers 252a and 256a. It is understood that the width of coupling member 262 is limited as such, and that it can be wider or narrower than shown. For example, dielectric coupling member 263 shows that the width can be narrower than the width of EHF transceivers 252a and 256a.

Dielectric coupling member 265 may be a flexible structure flanked by metal shield coupling members 264 and 266, and dielectric coupling member 267 may also be a flexible structure flanked by metal shielding coupling members 266 and 268. As shown, the dimensions of dielectric coupling member 265 may align with EHF transceivers 252c and 256c, and the dimensions of dielectric coupling member 267 may align with waveguides 254 and 258. Metal shield coupling members 264 and 266 can isolate coupling member 265 from coupling members 263 and 267. As shown, shielding members 264, 266, and 268 are co-aligned with respective shield members 253 and 257, though it is understood that such alignment is not mandatory. In some embodiments, metal shielding members 264, 266, and 268 may be discrete components that are placed adjacent to dielectric coupling members. In other embodiments, the metal shielding members can be integrally formed with a dielectric coupling member. This may be advantageous for providing a contiguous structure that is separated into discrete contactless pathways (one for each coupled pair) by the metal shielding members. For example, coupling member 265 may be integrally formed with metal shielding coupling members 264 and 266, and coupling member 267 may be integrally formed with metal shielding coupling members 266 and 268.

In some embodiments (not shown), a combination of different plastic and metal structures can be disposed directly on the EHF transceivers themselves to extend and/or shape the wireless emissions through the air. Examples of such structures can be found in commonly assigned, co-pending U.S. application Ser. No. 13/963,199. These structures can be used in lieu of a dielectric coupling member.

Figure 3A:
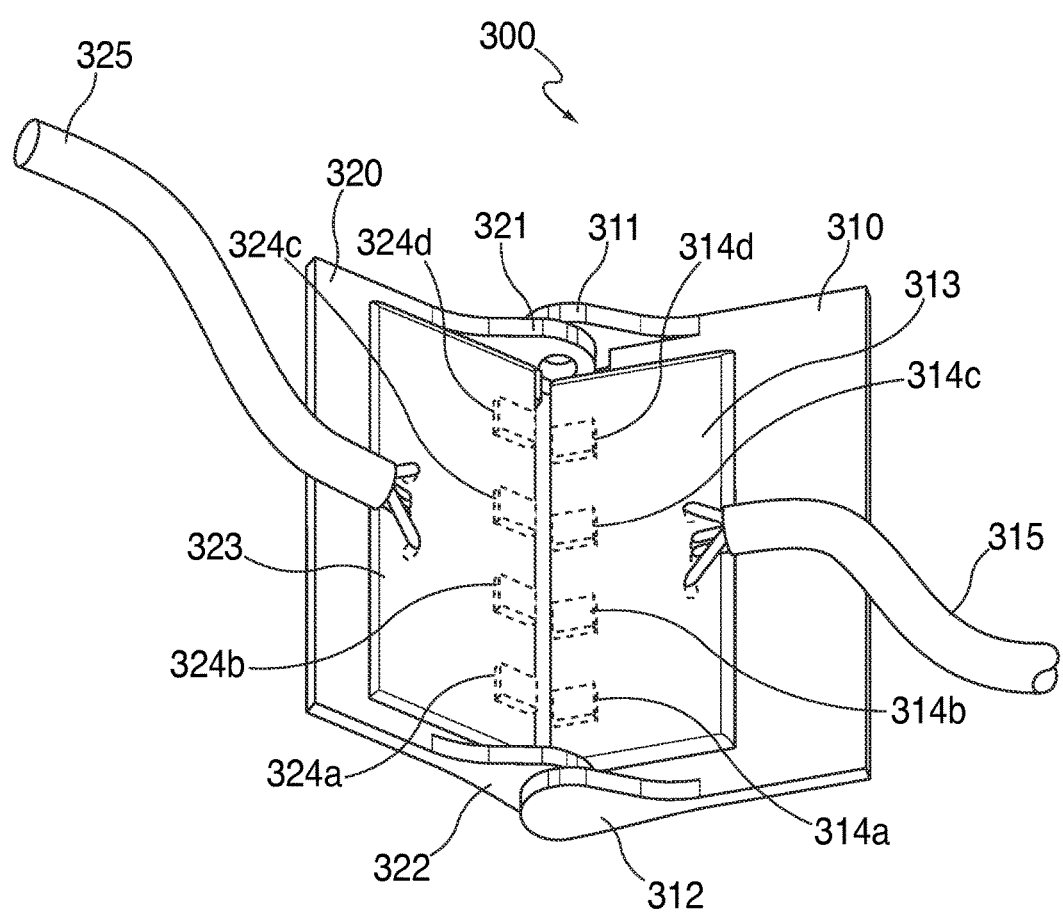
FIG. 3A shows an illustrative hinge, according to some embodiments.

Referring now to FIG. 3A, illustrative hinge 300 with co-aligned pairs of EHF transceivers is shown. As shown, hinge 300 can include member 310, which has male hinge members 311 and 312, and member 320, which has female hinge members 321 and 322. In some embodiments, members 310 and 320 can be generic representations of enclosures (e.g., enclosures 110 and 120). In other embodiments, members 310 and 320 can be structures that are incorporated into a device that enables the enclosures of the device to pivot (e.g., member 310 is fixed to enclosure 212 and member 320 is fixed to enclosure 213). Male hinge members 311 and 312 may interface with female hinge members 321 and 322, respectively, so that member 310 can pivot with respect to member 320, or vice versa.

Member 310 can have circuit board 313 disposed thereon, and EHF transceivers 314a-d can be mounted to board 313. Conductor 315 may be physically coupled to board 313 and traces (not shown) can be routed to different EHF transceivers 314a-d. Member 320 can have a similar arrangement in which circuit board 323 is disposed thereon, and EHF transceivers 324a-d can be mounted to board 323. Conductors 325 may be physically coupled to board 323 and traces (not shown) can be routed to different EHF transceivers 324a-d. EHF transceiver 314a is aligned with EHF transceiver 324a, and EHF transceiver 314b is aligned with EHF transceiver 324b, EHF transceiver 314c is aligned with EHF transceiver 324c, and EHF transceiver 314d is aligned with EHF transceiver 324d. The alignment is such that regardless of the position of member 310 with respect to member 320, the distance between each pair of EHF transceivers does not exceed a predetermined threshold. Thus, even if member 320 is pivoted 0, 90, or 180 degrees away from member 310 (as illustrated in FIGS. 3B-3D) the separation distance is controlled to ensure that the close proximity coupling among each EHF transceiver pair is maintained.

Figure 3B:
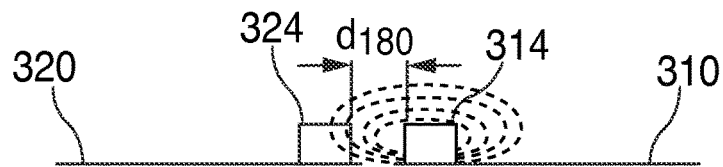
FIGS. 3B-3D show illustrative cross-sectional views of a hinge, according to some embodiments.
Figure 3C:
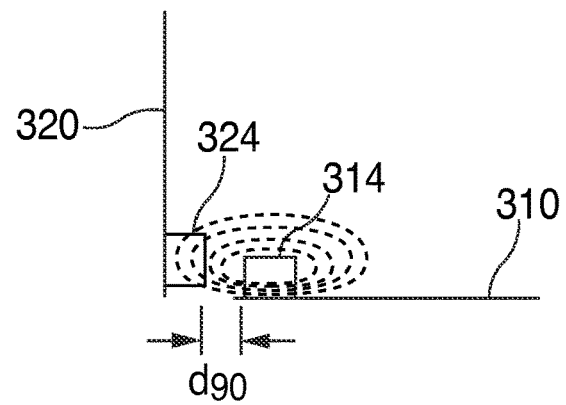
Figure 3D:
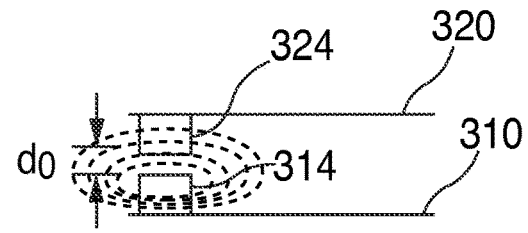

FIGS. 3B-3D shows illustrative cross-sectional views of hinge 300 of FIG. 3A in different pivot positions according to various embodiments. Some of the FIGS. show illustrative contactless signals emanating from one of the transceiver; these signals are shown by a series of dashed lines. In particular, FIG. 3B shows member 320 is pivoted 180 degrees away from member 310. The distance between transceivers 314 and 324 is $d_{180}$, where d represents a predetermined distance. FIG. 3C shows member 320 is pivoted 90 degrees away from member 310, and that the distance between transceivers 314 and 324 is $d_{90}$. FIG. 3D shows member 320 is pivoted 0 degrees away from member 310, and that the distance between transceivers 314 and 324 is $d_0$. Each of the distances, $d_0$, $d_{90}$, and $d_{180}$ are less than a predetermined threshold. The predetermined threshold can be a maximum distance of separation between coupled pairs of EHF transceivers in which minimum performance metrics associated with that coupled pair can be sustained. For example, if the performance metrics require a minimum data throughput with a maximum data packet resend rate, an appropriate distance threshold can be selected to achieve those metrics.

Note the absence of any physical medium existing within the space between each pair of EHF transceivers. As shown, and in this particular embodiment, air may serve as the transmission medium. That is, there is no physical interface coupling any one of transceivers 314a-d to respective ones of transceivers 324a-d. The physical couplings of hinge 300 can exist solely in the male and female hinge members.

Figure 4A:
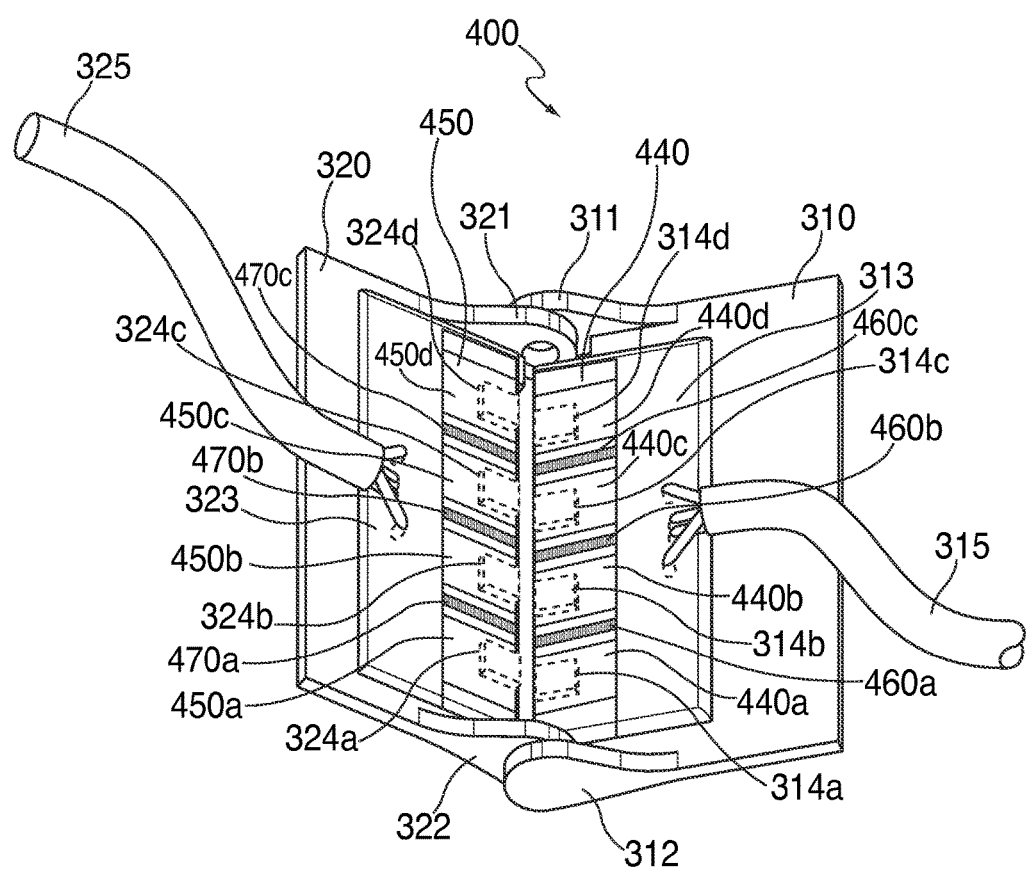
FIG. 4A shows an illustrative hinge with waveguides, according to some embodiments.

FIG. 4A shows illustrative hinge 400 incorporating waveguide members in accordance with an embodiment. Hinge 400 can be similar in many respect to hinge 300 of FIG. 3A, except now, hinge 400 can include waveguide members 440a-d and 450a-d. In particular, each waveguide member 440a-440d may be disposed over respective EHF transceiver 314a-314d and each waveguide member 450a-450d may be disposed over respective EHF transceiver 324a-324d. In some embodiments, waveguide members 440 and 450 can completely encapsulate the EHF transceivers, and other embodiments, members 440 and 450 may be placed adjacent to the EHF transceivers. Waveguide members 440 and 450 can be operative to guide or focus the transmission of data between the EHF transceivers, and in some embodiments, can further ensure that close proximity coupling is maintained throughout a desired range of motion. In some embodiments, members 440 and 450 may serve as a collimator for their respective transceivers. Waveguide members 440 and 450 can be constructed from any suitable material, including, for example, plastics. Moreover, waveguide members 440 and 450 can be constructed to take any suitable shape. In some embodiments, the shape of waveguide members 440 and 450 can be shaped to maximize the close proximity coupling for the hinge's range of motion. In other embodiments, waveguide members 440 and 450 may be constructed such that interference fits exist between them (as illustrated below in FIGS. 4C and 4D). Such a construction can ensure a physical dielectric coupling exists between each coupled pair.

Hinge 400 can optionally include shield members 460a-460c disposed as shown between EHF transceivers 314a-314d, and shield members 470a-470c disposed as shown between EHF transceivers 324a-324d. Shield members 460a-460c and 470a-470c may be constructed from, for example, a metal and may take any suitable shape. The shape as shown for shield members 460a-460c and 470a-470c include a semi-circular shape. Hinge 400 can optionally include one or more dielectric coupling members (not shown) that are operative to physically couple coupled pairs of EHF transceivers together. An example of this is shown in FIGS. 4B and 4I, below.

Figure 4B:
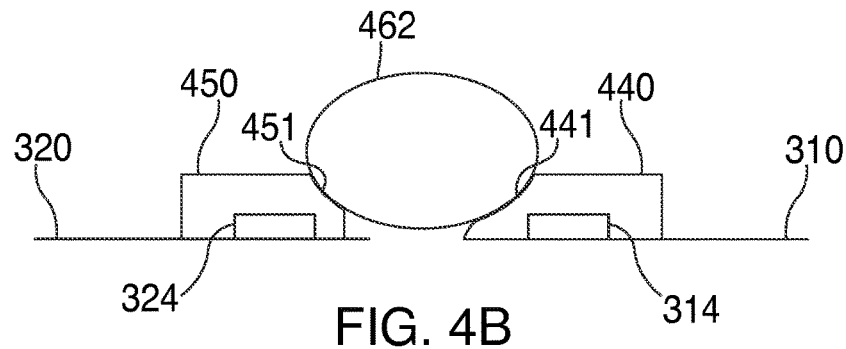
FIGS. 4B-4D show illustrative cross-sectional views of a hinge with waveguides, according to some embodiments.
Figure 4C:
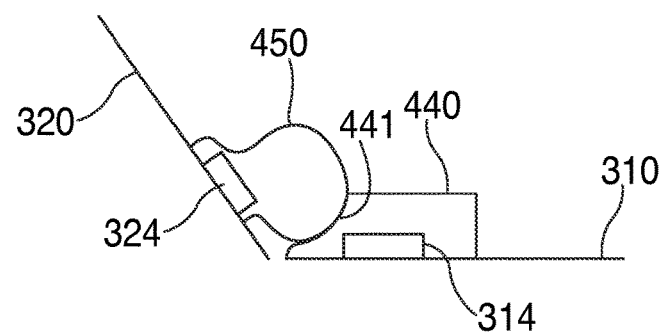
Figure 4D:
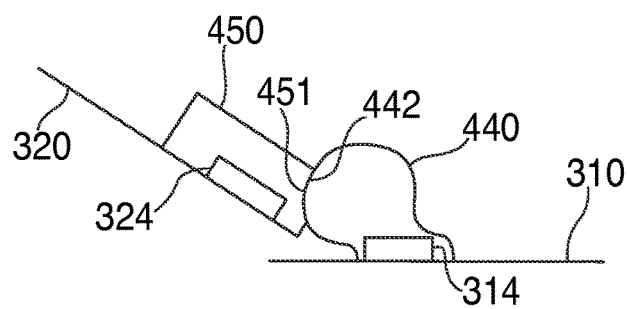

FIGS. 4B-4D show illustrative cross-sectional views of hinge 400 of FIG. 4A in different pivot positions and with different waveguide shapes, according to various embodiments. As shown, waveguide members 440 and 450 can completely encapsulate transceivers 314 and 324, respectively. Moreover, members 440 and 450 are shown to have particular shapes, 441 and 451, respectively, that may assist in focusing transmission of contactless signals between transceivers 314 and 324. FIG. 4B shows that waveguides 440 and 450 both have concave shapes 441 and 451, respectively, that interface with dielectric coupling member 462. Members 310 and 320 may each independently rotate about dielectric coupling member 462. FIG. 4C shows that waveguide 440 has concave shape 441 and waveguide 450 has a bulbous shape. The bulbous shape of waveguide 450 may interface fit with the concave shape 441. When member 320 pivots with respect to member 310, the bulbous shape of waveguide 450 may maintain its interface fit within concave shape 441. FIG. 4D shows that waveguide 440 has bulbous shape 442 and waveguide 450 has concave shape 451. Waveguide 450 may maintain an interface fit with waveguide 440. In particular, waveguide 450 may rotate around bulbous shape 442 while simultaneously maintaining contact with waveguide 440. Further note, that in FIG. 4B, dielectric coupling 462 that is separate from waveguides 440 and 450 may provide a rigid physical interface for coupling transceivers 314 and 324. In FIGS. 4C and 4D, however, the waveguides can serve as the transmission medium.

Figure 4E:
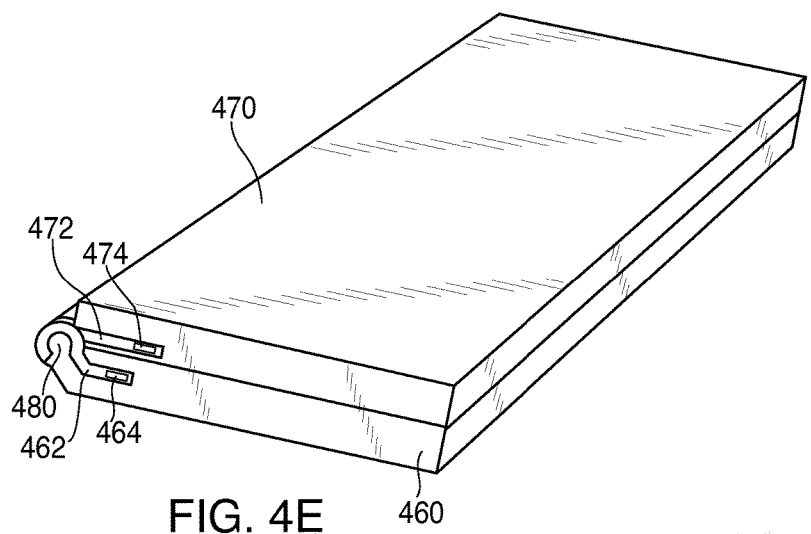
FIGS. 4E-4H show different views of a device in different configurations, according to some embodiments.
Figure 4F:
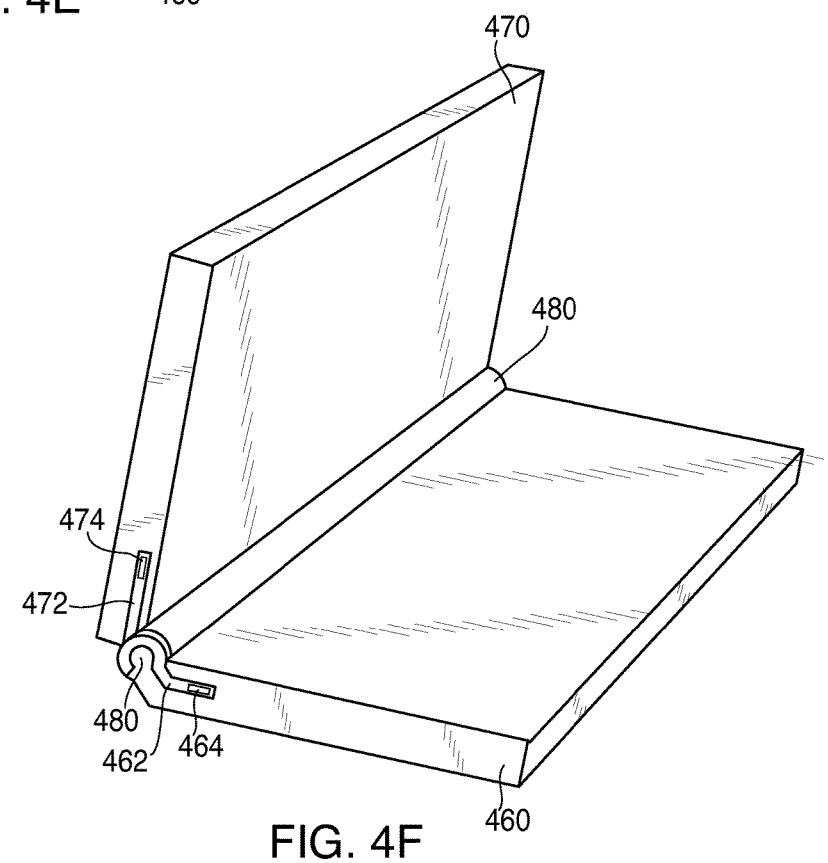
Figure 4G:
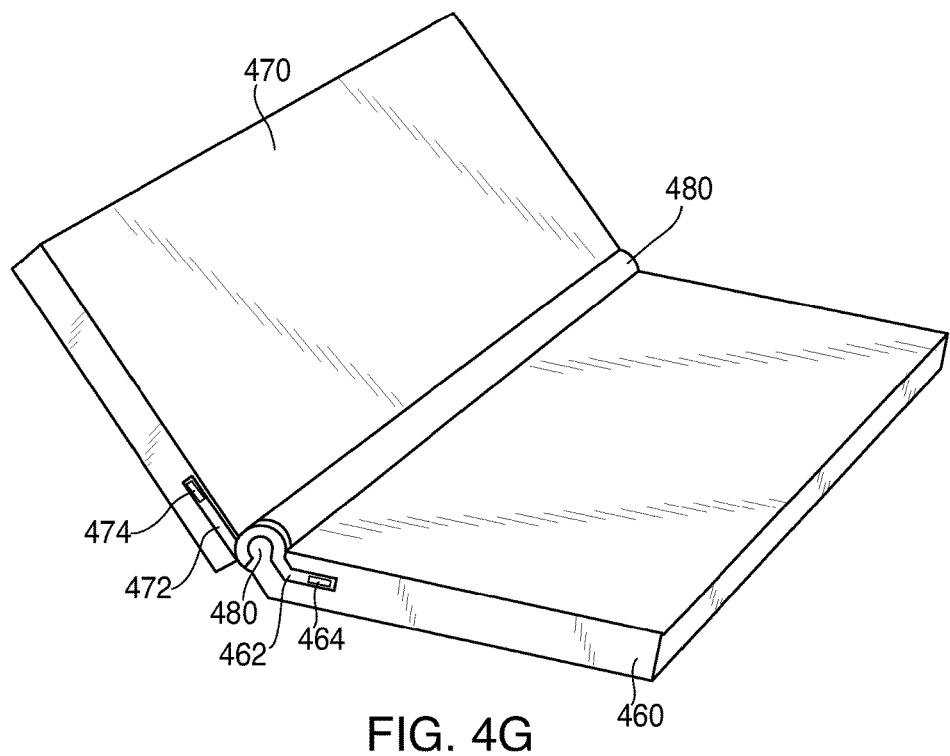
Figure 4H:
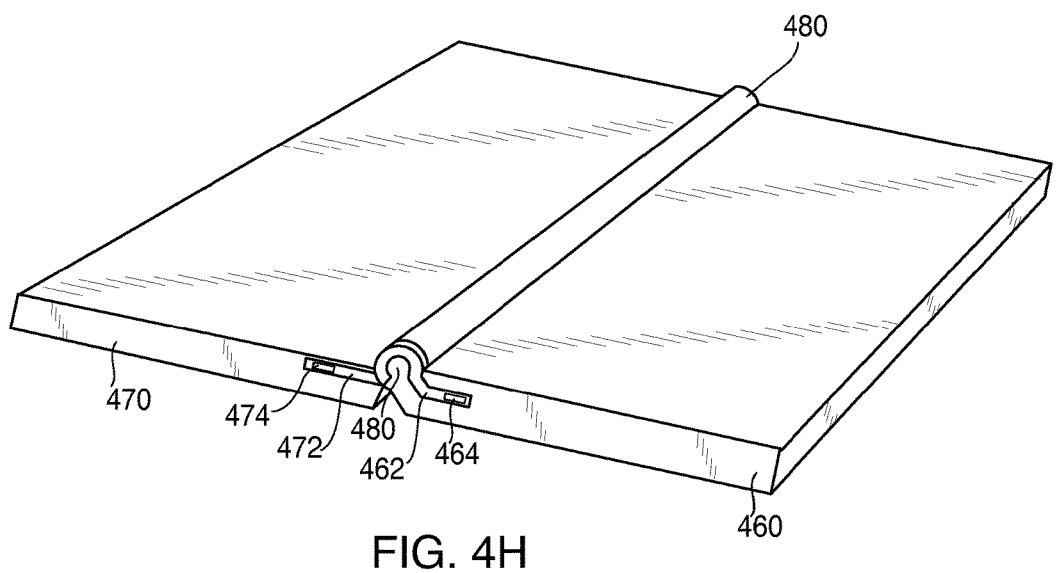

FIGS. 4E-4H show different views of an electronic device in different configurations, according to some embodiments. In particular, FIG. 4E shows the electronic device in a closed configuration, FIGS. 4F and 4G shows different partially open configurations, and FIG. 4H shows a fully open configuration. Each one of FIGS. 4E-4H can include enclosure 460, enclosure 470, and hinge 480. Enclosures 460 and 470 can be connected together via hinge 480. Enclosure 460 can include waveguide 462 and EHF transceiver 464. Waveguide 462 may have a hook shape that follows or mimics the contour of hinge 480. In some embodiments, waveguide 462 may be at least partially integrated with hinge 480. Enclosure 470 can include waveguide 472 and EHF transceiver 474. Waveguide 472 may be in physical contact with waveguide 462 independent of enclosure 460's position with respect to enclosure 470. That is, waveguide 472 can follow the hook contour of waveguide 462 to ensure a close proximity coupling is maintained between EHF transceivers 464 and 474.

Figure 4I:
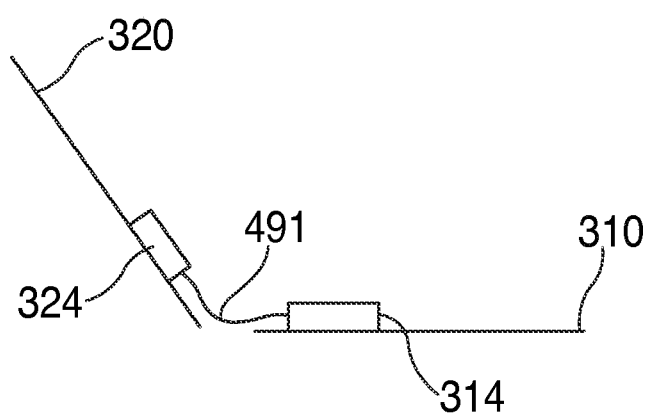
FIG. 4I shows an illustrative cross-sectional view of a hinge that includes a dielectric coupling member, according to various embodiments.

FIG. 4I shows an illustrative cross-sectional view of hinge 400 of FIG. 4A that includes dielectric coupling member 491, according to various embodiments. As shown, waveguide members 440 and 450 are omitted, but they can be included, if desired. Dielectric coupling member 491 can provide a physical medium for physically coupling EHF transceiver 314 to EHF transceiver 324. In one embodiment, dielectric coupling member 491 may be a flexible coupling member.

In other embodiments, the close proximity coupling between respective pairs of EHF transceivers can be maintained or enhanced using EHF waveguide hinges according to various embodiments. EHF waveguide hinges according to embodiments herein can perform two duties: (1) provide hinge support for enabling two enclosures to move with respect to each other and (2) serve as a waveguide for the contactless transmissions between coupled pairs of transceivers. The hinge and the waveguide can be one and the same. The hinge support can be provided in a variety of ways. For example, as previously shown in FIG. 2, electronic devices can use different hinges according to various embodiments. The waveguiding duty of the hinges can be implemented in several ways, many of which are discussed in detail in connection with FIGS. 5-10. In general, the waveguiding construction of the hinges can assist in the propagation of contactless signals between coupled pairs of EHF transceivers.

Figure 5:
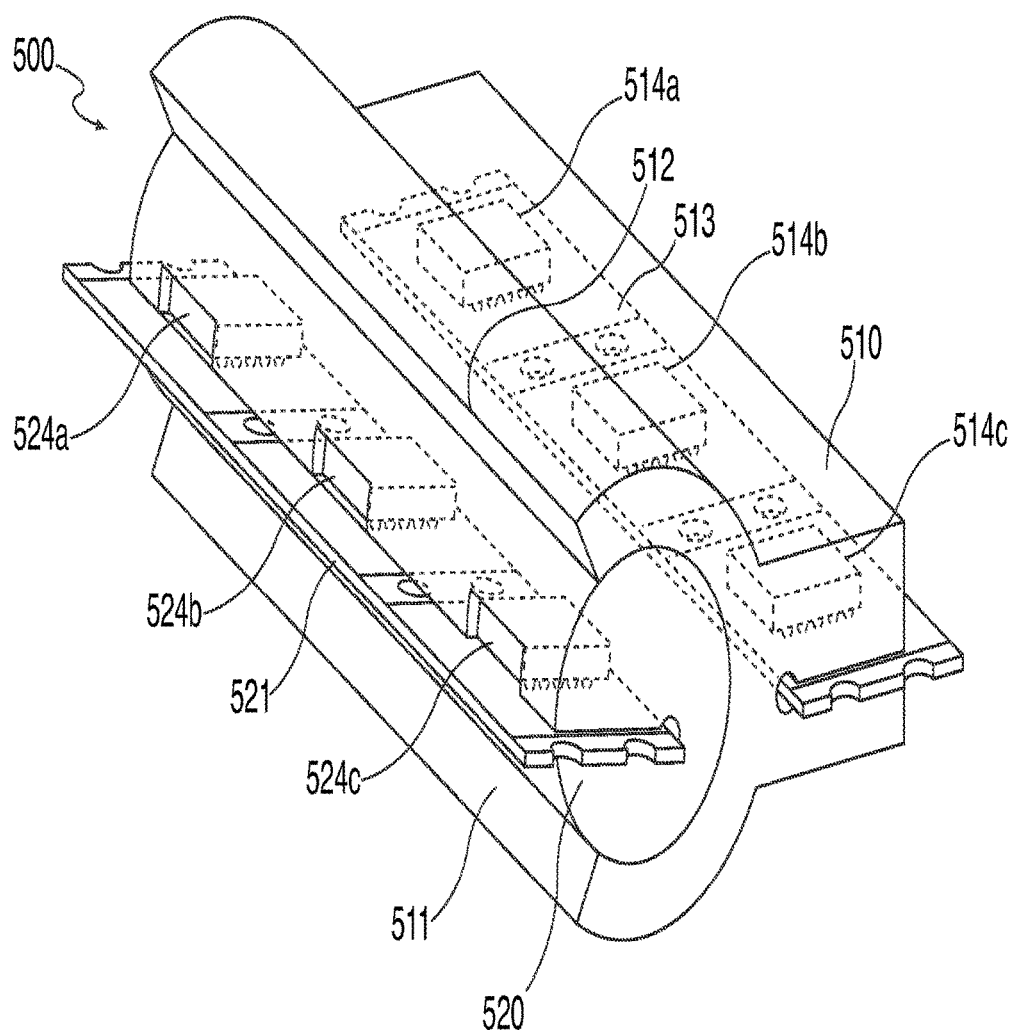
FIG. 5 shows an illustrative EHF waveguide hinge, according to some embodiments.

FIG. 5 shows an illustrative EHF waveguide hinge 500 according to an embodiment. Hinge 500 can include socket member 510 (e.g., a female member) and joint member 520 (e.g., a male member). Joint member 520 may be movably secured by socket member 510 and can rotate with respect thereto. Socket member 510 and joint member 520 may be constructed from a dielectric material such as plastic. Socket member 510 partially encloses joint member 520. This can be seen by the "c-shape" of member 510 that partially surrounds joint member 520, which can exhibit a cylindrical shape. In some embodiments, the c-shape of socket member 510 can define the rotation limits of joint member 520. In particular, rotation stops 511 and 512 can define the rotation limit of joint member 520. Member 521, which can be mated or integrally coupled to joint member 520, may protrude from an outer periphery of member 520 and abut either rotation stop 511 or 512 depending on a rotation angle of member 520. In some embodiments, socket member 510 can be constructed to permit any desired range of motion. For example, the range of motion can range from 0 to 270 degrees, 0 to 180 degrees, or 0 to 120 degrees.

Socket member 510 can be coupled to member 513, which may have EHF transceivers 514a-c residing thereon. In some embodiments, socket member 510 can fully encapsulate EHF transceivers 514a-c, as shown. Pivot member 520 can at least partially encapsulate or fully encapsulate EHF transceivers 524a-c residing on member 521. In some embodiments, members 513 and 521 can be printed circuit boards. EHF transceivers 514a and 524a may form a coupled pair, and EHF transceivers 514b and 524b may form a coupled pair, and so on. The encapsulation of transceivers 514a-c by socket member 510 and transceivers 524a-c by pivot member 520 can enable the combination of members 510 and 520 to serve as a waveguide for contactless transmissions between coupled pairs of EHF transceivers.

Transceivers 514a-c and 524a-c can be effectively physically coupled together via the waveguide formed by the coupling of members 510 and 520. Thus, in operation, even though the coupled pairs of EHF transceivers communicate data to each other via close proximity coupling, the close proximity coupling can be further enhanced by the coupling of members 510 and 520. In some embodiments, this coupling can result in a substantially robust close proximity coupling that ensures contactless connectivity is preserved throughout hinge 500's range of motion.

Figure 6:
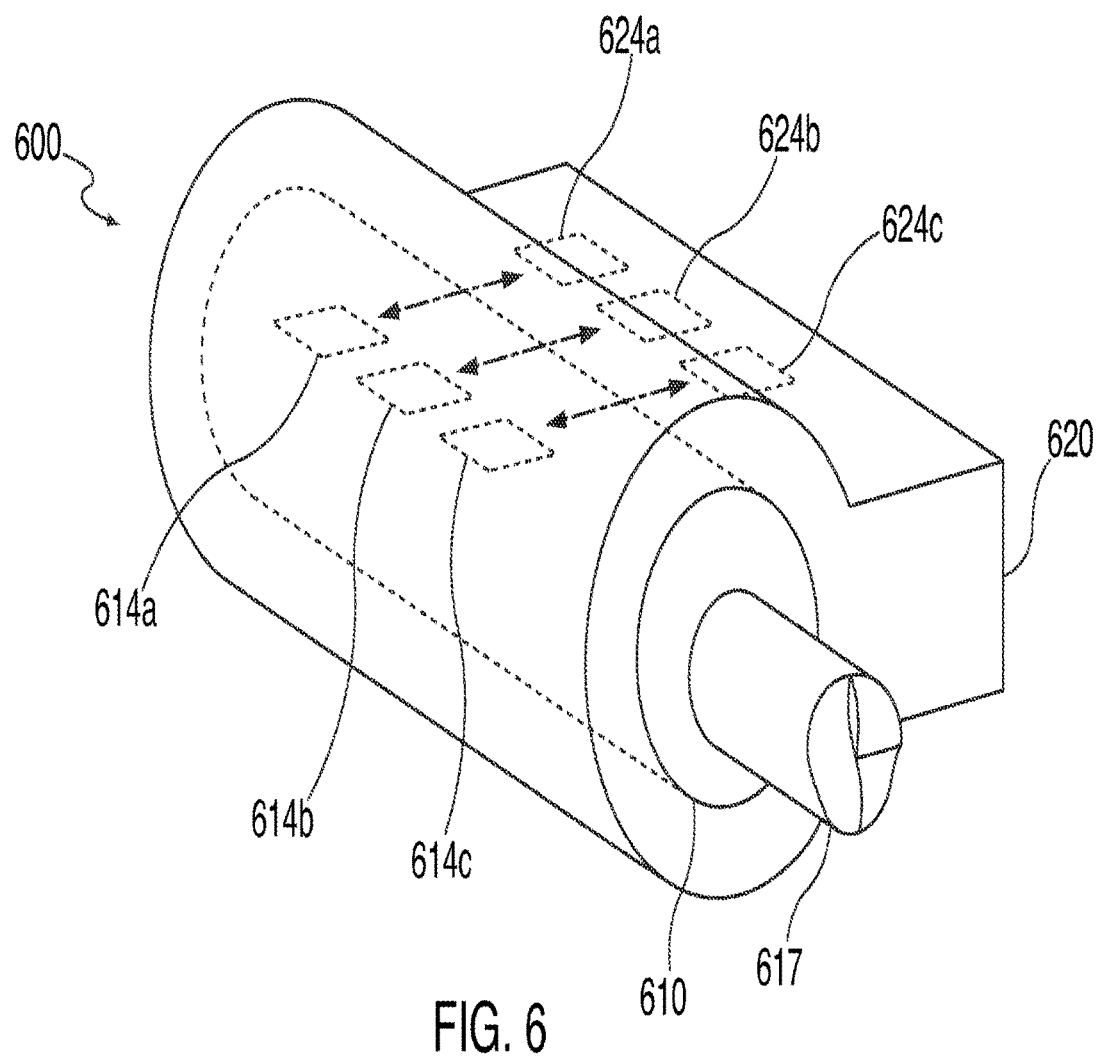
FIG. 6 shows an illustrative EHF waveguide hinge, according to some embodiments.

FIG. 6 shows an illustrative view of EHF waveguide hinge 600 according to embodiment. As shown, hinge 600 can include male member 610 that can be insertably coupled to female member 620. If desired, male member 610 can rotate 360 degrees within female member 620. In other embodiments, male member 610 have can be limited to rotate to a predefined limit. Extension member 617, which can be integrally formed with male member 610 can be, for example, secured to an enclosure of an electronic device. Once extension member 617 is secured, either male member 610 may be rotated within female member 620, or female member 620 may be rotated about male member 610. Hinge 600 can be similar in many respects hinge 500 (of FIG. 5), except now female member 620 fully encloses male member 610. Male member 610 can encompass EHF transceivers 614a-c and female member 620 can encompass EHF transceivers 624a-c. When male member 610 is inserted into female member 620, paired couplings can exist between EHF transceivers 614a and 624a, 614b and 624b, and 614c and 624c. The coupling of male and female members 610 and 620 can form a waveguide that substantially enhances a close proximity coupling between each coupled pair.

Figure 7:
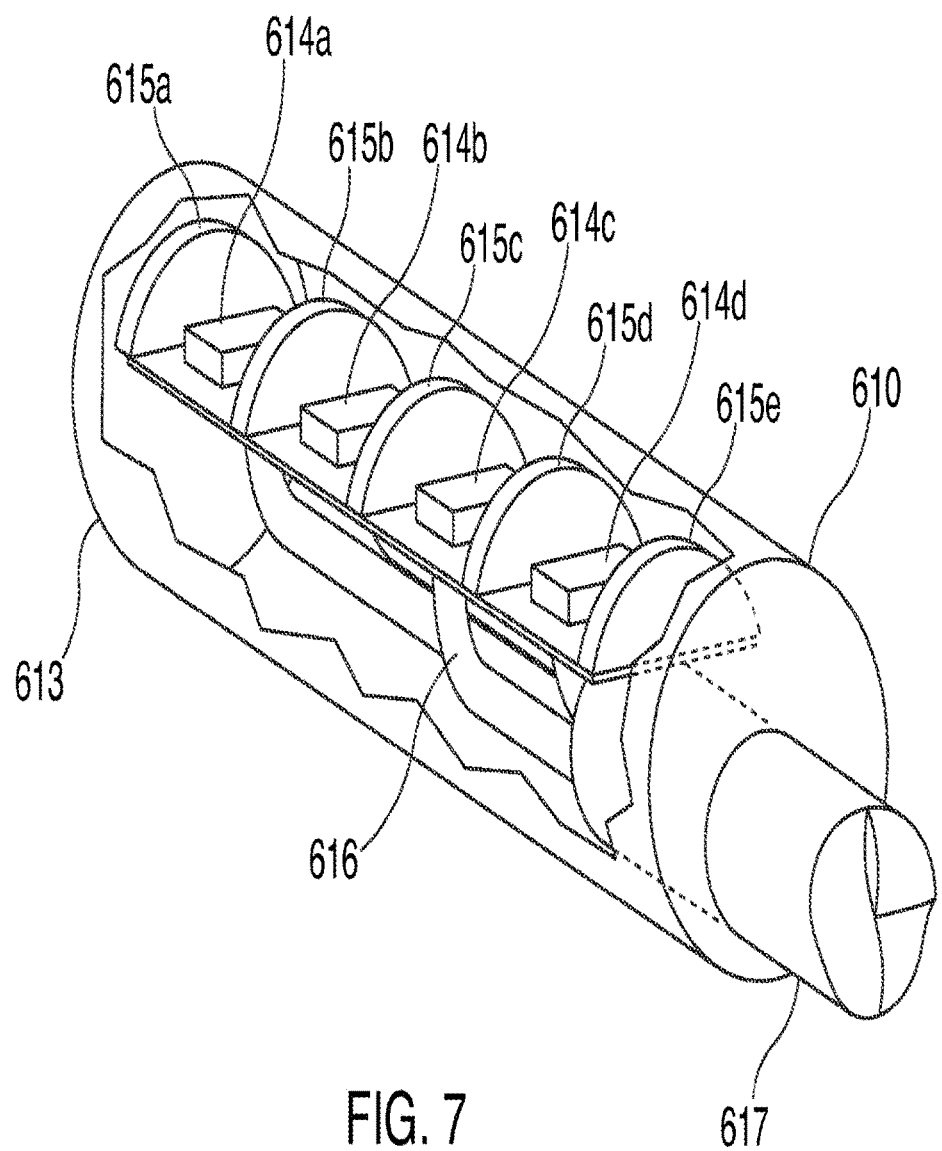
FIG. 7 shows a detailed illustrative view of a portion of the EHF waveguide hinge of FIG. 6, according to some embodiments.

FIG. 7 shows a detailed view of male member 610 of FIG. 6 in accordance with embodiment. As shown, male member 610 can include a cylindrical member that encompasses circuit board 613, which has EHF transceivers 614a-d and shield members 615a-e mounted thereon, and conductors 616 that extend from extension member 617 to various locations on circuit board 613. Shield member 615a-e can help reduce cross-talk among adjacent EHF transceivers. Conductors 616 may pass through extension member 617 so that signals can be provided to and transported from EHF transceivers 614a-d. Extension member 617 may be a structurally enhanced member that is able to withstand various stresses that may be applied to male member 610 during use.

Figure 8A:
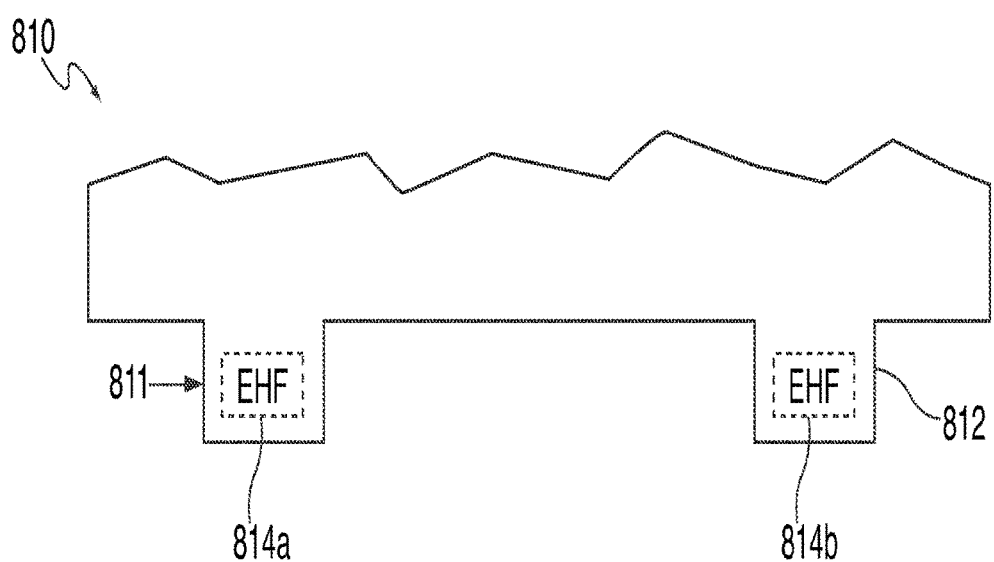
FIGS. 8A-8C show different views of a device using EHF waveguide hinges according to some embodiments.
Figure 8B:
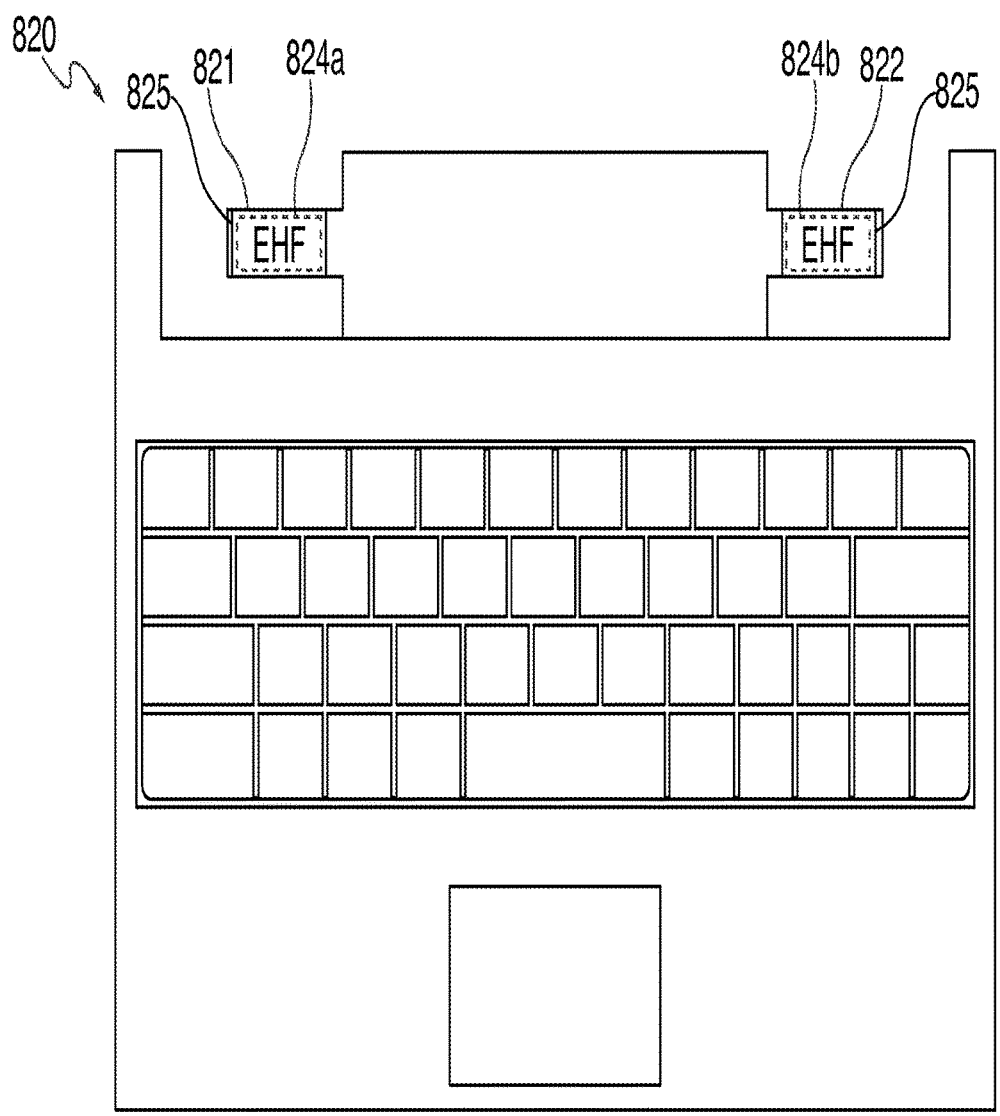
Figure 8C:
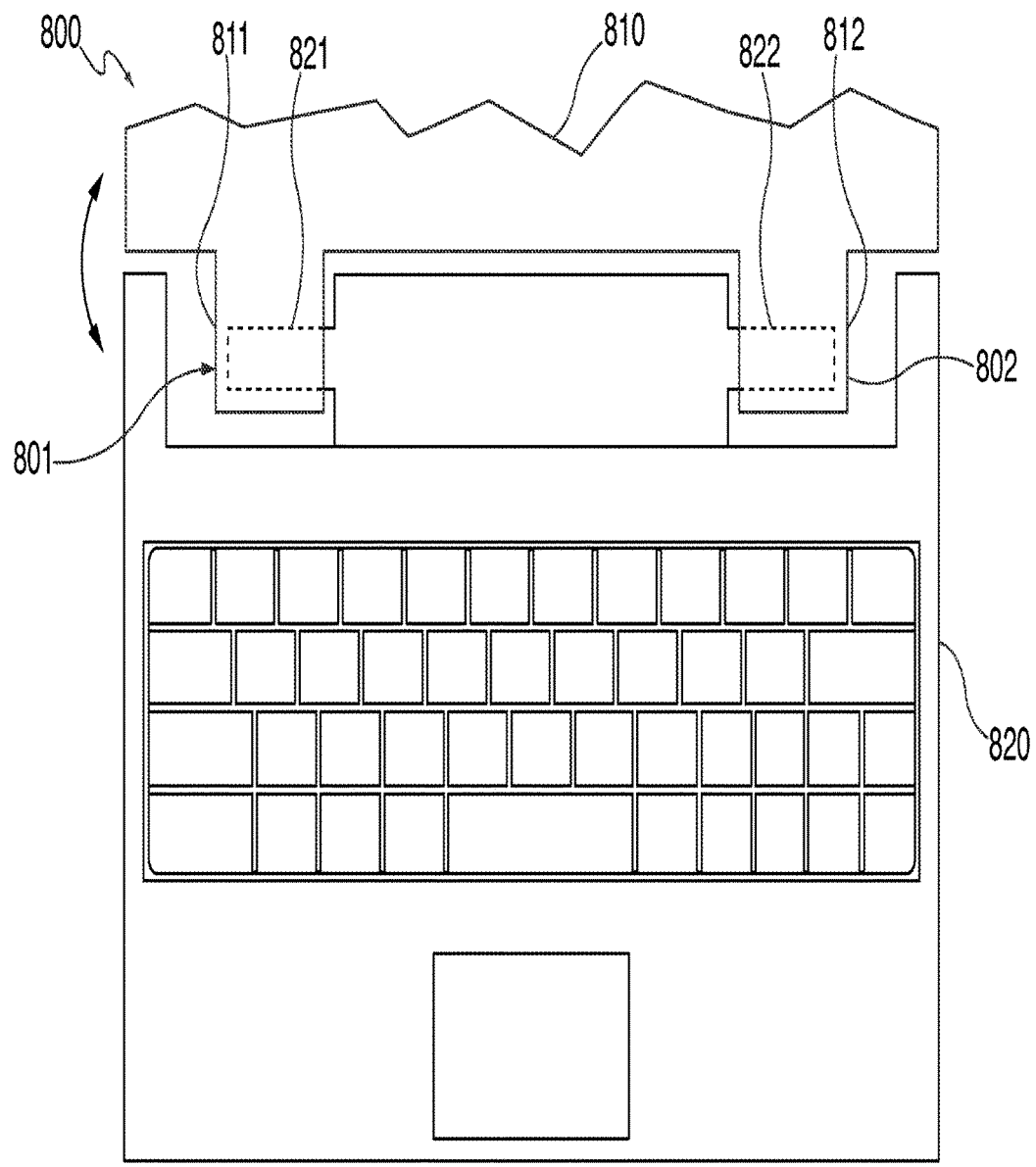

FIGS. 8A-8C show different views of a device using EHF waveguide hinges according to an embodiment. In particular, FIG. 8A shows an illustrative top view of upper portion 810, FIG. 8B shows an illustrative top view of lower portion 820, and FIG. 8C shows an illustrative top view of device 800 with upper portion 810 coupled to lower portion 820. Referring now specifically to FIG. 8A, upper portion 810 can include female hinge members 811 and 812. For example, hinge members 811 and 812 can be similar to female members 620 of FIG. 6. Female hinge members 811 and 812 can encapsulate EHF transceivers 814a and 814b, respectively. Referring now specifically to FIG. 8B, lower portion 820 can include male hinge members 821 and 822, which can encapsulate EHF transceivers 824a and 824b, respectively. Male hinge members 821 and 822 can be similar to male member 610 of FIG. 6. Referring now to FIG. 8C, when device 800 is constructed, the male hinge member 821 can be coupled to female hinge member 811 to form EHF waveguide hinge 801 and male hinge member 822 can be coupled to female hinge member 812 to form EHF waveguide hinge 802.

Waveguide hinges 801 and 802 can serve as contactless transmission pathways for coupled pairs of EHF transceivers and as a mechanical pivot mechanism for device 800. During pivot of upper portion 810, female hinge members 811 and 812 may rotate about their respective male hinge members 821 and 822. Thus, during operation of device 800, data generated by circuitry contained within keyboard portion 820 can be transmitted to circuitry contained within monitor portion 810 via coupled pairs of EHF transceivers contained in hinges 801 and 802. In addition, any data generated by circuitry contained in monitor portion 810 can be transmitted to circuitry contained within lower portion 820 via EHF transceivers contained in hinges 801 and 802.

In some embodiments, power may be wirelessly transmitted from lower portion 820 to monitor portion 810 via one or both hinges 801 and 802. In such an embodiment, wireless power transmission/reception coils (not shown) can be incorporated into hinges 801 and 802. In another embodiment, a combination of contactless data transmission and wired power transmission can be used in hinges 801 and 802. For example, contactless data transmission can be achieved according to embodiments described herein and wired power transmission may be achieved by using an electrically conductive pathway that is incorporated into one or both hinges 801 and 802. As shown in FIG. 8B, wired contacts 825 may be incorporated in into male hinge portions 821 and 822 for transmitting power to contacts (not shown) contained in female hinge members 811 and 812.

Figure 9:
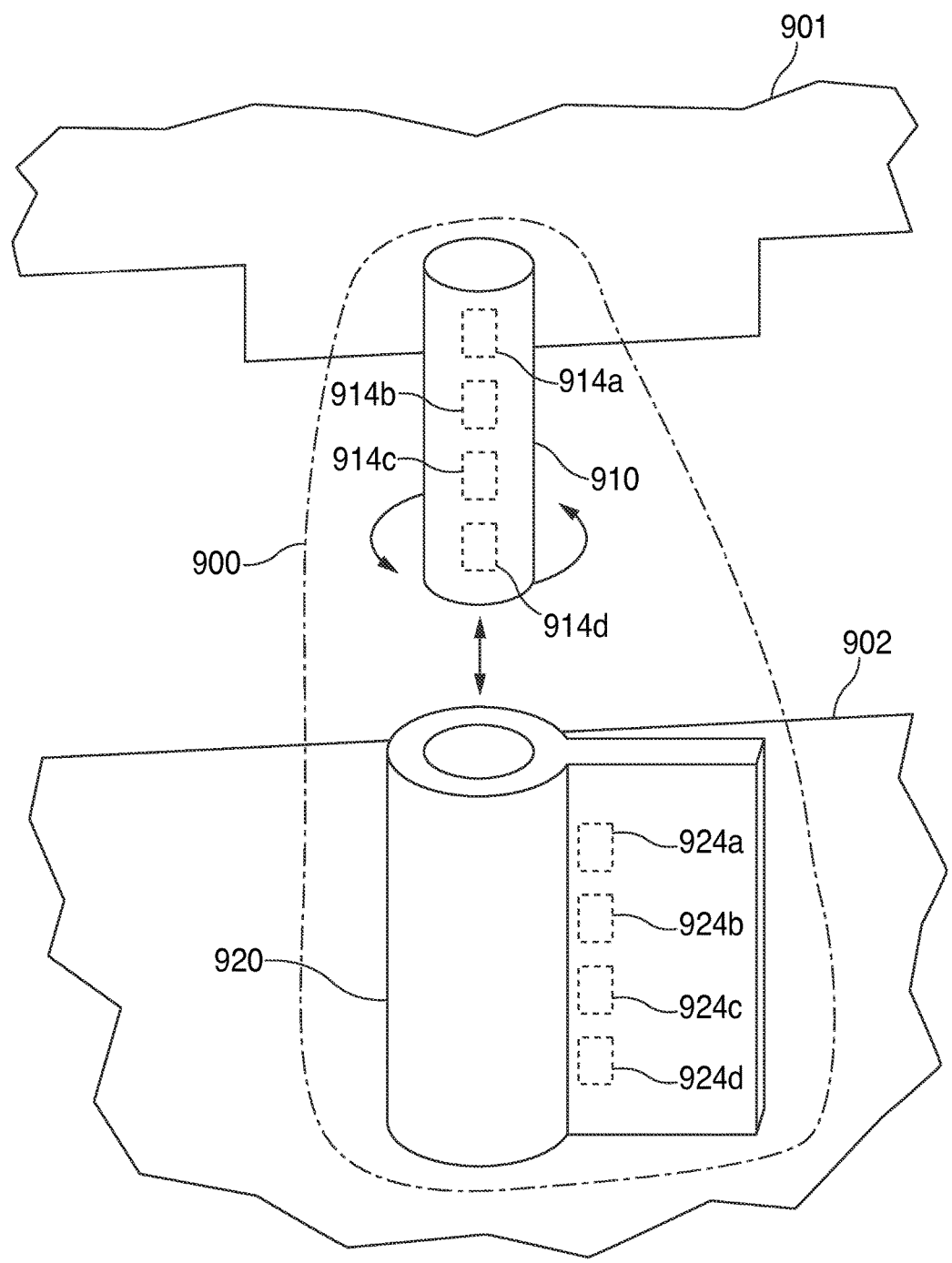
FIG. 9 shows a partially exploded perspective view of a EHF waveguide hinge, according to some embodiments.

FIG. 9 shows a partially exploded perspective view of EHF waveguide hinge 900 according to an embodiment. Waveguide hinge 900 can enable structure 901 to swivel freely with respect to structure 902. For example, waveguide hinge 900 may be used as a hinge in device 220 of FIG. 2, which enables structure 901 to rotate 360 degrees with respect to structure 902. Male hinge member 910 can be secured to structure 901 and can be removably coupled to female hinge member 920. Male hinge member 910 may have a cylindrical shape so that it can spin within female hinge member 920. If desired, male hinge member 910 can be removed from female hinge member 920 so that structure 901 can be removed from structure 902. Male hinge member 910 can include EHF transceivers 914a-d that can be coupled to transceivers 924a-d, respectively, when member 910 is secured within female member 920. Female hinge member 920 can be secured to structure 902 and can contain transceivers 924a-d. As shown, all transceivers 924a-d can be arranged adjacent to a center axis of female hinge member 920. This is merely illustrative.

Figure 10A:
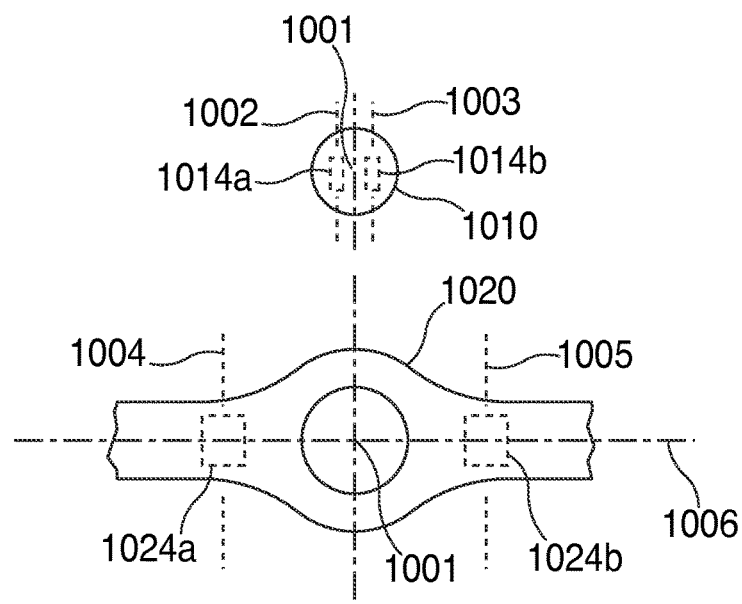
FIGS. 10A and 10B show illustrative top views of different male and female hinges in which EHF transceivers are mounted in multiple locations with respect to a center axis, according to some embodiments.
Figure 10B:
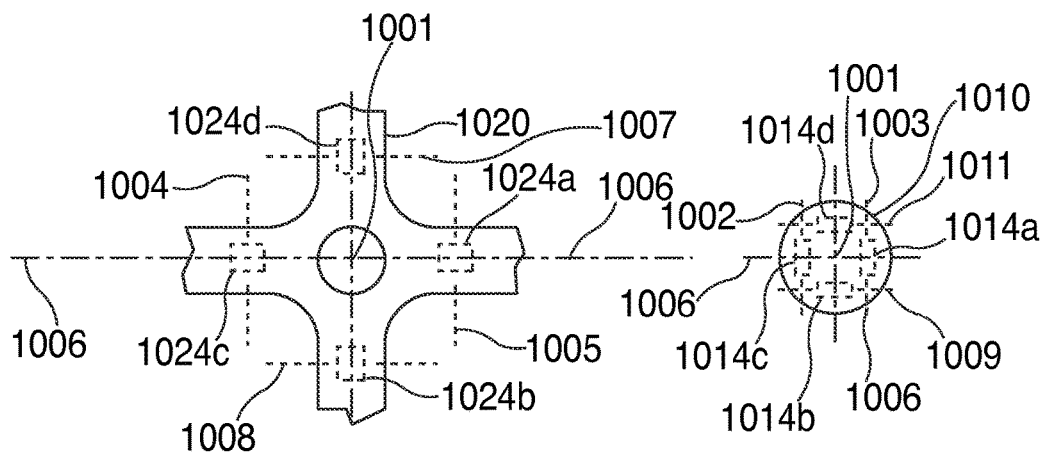

FIGS. 10A and 10B show illustrative top views of different male and female hinges in which EHF transceivers are mounted in multiple locations with respect to a center axis, in accordance with various embodiments. Referring now to FIG. 10A, illustrative top views of male hinge member 1010 and female hinge member 1020 are shown. Male hinge member 1010 can include transceiver 914a, which is aligned with axis 1002, and transceiver 914b, which is aligned with axis 1003. Axes 1002 and 1003 are offset with respect to center axis 1001, but are aligned with axis 1006. Female hinge member 1020 can include transceiver 1024a, which is aligned with axis 1004, and transceiver 1024b, which is aligned with axis 1005. Axes 1004 and 1005 are offset with respect to center axis 1001. Placement of transceivers on multiple axes can provide increased data throughput capacity, for example.

FIG. 10B shows illustrative top views of male hinge member 1010 and female hinge member 1020. Male hinge member can include transceivers 1014a-d disposed on the four points of a compass. In particular, transceivers 1014a and 1014c are aligned with axis 1006, and transceivers 1014b and 1014d are aligned with axis 1001. Transceiver 1014a is also aligned with axis 1003, transceiver 1014b is also aligned with axis 1009, transceiver 1014c is also aligned with axis 1002, and transceiver 1014d is aligned with axis 1011. Axes 1009 and 1011 are offset with respect to axis 1006, and axes 1002 and 1003 are offset to axis 1001. Female hinge member 1020 can include transceivers 1024a-d disposed on the four points of a compass. In particular, transceivers 1024a and 1024c are aligned with axis 1006, and transceivers 1024b and 1024d are aligned with axis 1001. Transceiver 1024a is also aligned with axis 1005, transceiver 1024b is also aligned with axis 1008, transceiver 1024c is also aligned with axis 1004, and transceiver 1024d is aligned with axis 1007. Axes 1007 and 1008 are offset with respect to axis 1006, and axes 1004 and 1005 are offset to axis 1001.

Figure 11:
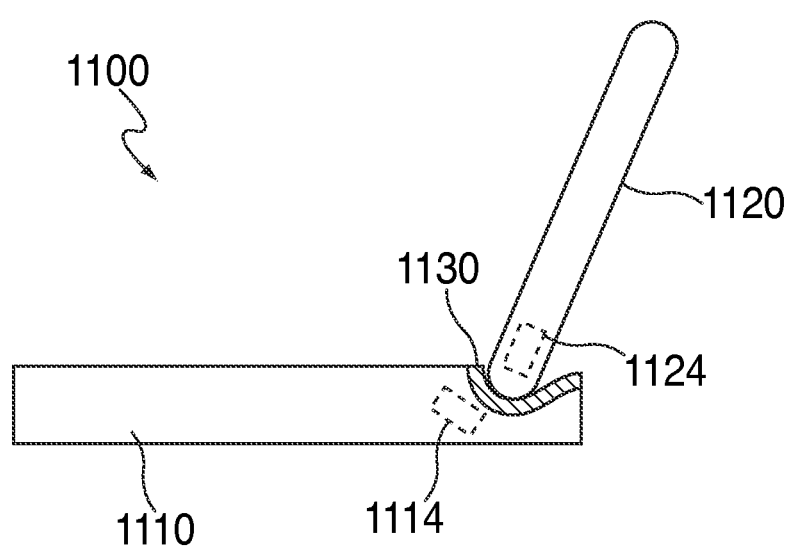
FIG. 11 shows an illustrative cross-sectional view of a laptop apparatus that uses a self-levitating hinge that uses EHF transceivers for transmitting data via a close proximity coupling, according to some embodiments.

FIG. 11 shows an illustrative cross-sectional view of a laptop apparatus that uses a self-levitating hinge that uses EHF transceivers for contactlessly transmitting data between enclosure 1110 and enclosure 1120, according to various embodiments. Enclosure 1120 can be held in place with one or more magnetic fields. Enclosure 1110 can include one or more transceivers 1114 and enclosure 1120 can include transceivers 1124. Transceivers 1114 and transceiver 1124 can form coupled pairs for transmitting data. Waveguide 1130 may optionally be included to further enhance the contactless transmission of data with each coupled pair of EHF transceivers.

The aforementioned description refers to various embodiments for enabling contactless communications between hinged components. The following description refers to various embodiments involving a self-contained, highly portable, EHF enabled display apparatus that is operable to receive data from an "active surface" via a close proximity coupling that exists between the EHF enabled display apparatus and the active surface, and that processes the data for presentation on the EHF enabled display. In some embodiments the EHF enabled display apparatus may be a card-shaped device that approximates the size of a conventional credit card and that may fit in a pocket, purse, or wallet. The EHF enabled display apparatus can be a relatively simple device that includes a display, a display controller, and EHF transceivers, and optionally can include input circuitry such as touch sensors. The active surface may be an apparatus that can provide data, including display data, to the EHF enabled display apparatus via EHF transceivers. In addition, the active surface may have limited input capabilities, and may be devoid of a display. In some embodiments, the EHF enabled display apparatus can serve as a user interface to a device—the active surface—that does not have a user interface. In effect, it serves as a gateway or window to content contained and generated by the active surface without needing the circuitry or resources necessary for independently generating and presenting such content itself.

The EHF enabled display apparatus may only be operative when it is placed in close proximity of the active surface apparatus. When the EHF display apparatus is placed on the active surface, a close proximity coupling can be established that enables the active surface to provide data to the apparatus. The EHF display apparatus can then display the information and process inputs (e.g., touch-screen inputs, finger recognition, etc.) and provide those inputs to the active surface. The EHF enabled apparatus may not function when the EHF enabled display apparatus is not in proximity of an active surface (e.g., contained in a person's pant pocket). Thus, when the EHF enabled device is removed from the active surface, it may be an inert, functionless device.

The EHF enabled display apparatus can serve as a gateway, key, or user interface for accessing content from an active surface system, where that system may or may not include a user interface of its own. In one embodiment, based on security information contained in the EHF display apparatus and/or user input, a user of the EHF display apparatus may be presented with selective content based on that user's security/access credentials. For example, a first user may be granted a first level of access based on his credentials, and a second user may be granted a second level of access based on his credentials, where the second level of access is greater than the first level of access. The active surface can provide content and/or access to the content that is commensurate with the user's level of access. In some embodiments, the EHF enabled display apparatus can be used to authenticate a user transaction such as a payment card transaction or it can be used as an access card. If desired, two factor authentication may be required by an active surface before the EHF display apparatus is permitted to access content. Two factor authentication can require that user use the appropriate EHF display apparatus and provide an appropriate user input (e.g., fingerprint, pin code, facial recognition, retina recognition, etc.). In other embodiments, the EHF enabled display apparatus may be used an ID card. For example, when the ID card is placed on an active surface, a default image of the user may be displayed.

The same EHF enabled display apparatus may be used with multiple different active surfaces, and each active surface can provide its local data to the display apparatus. The content presented by each active surface to the user via the EHF enabled display apparatus may be different, but the underlying technology for enabling it may be the same. For example, if one active surface includes a security access panel and another active surface includes a general purpose computer, the EHF enabled display apparatus may display a keypad when placed on the security access panel, and the EHF enabled display apparatus may display a touchscreen user interface when placed on the general purpose computer.

Figure 12:
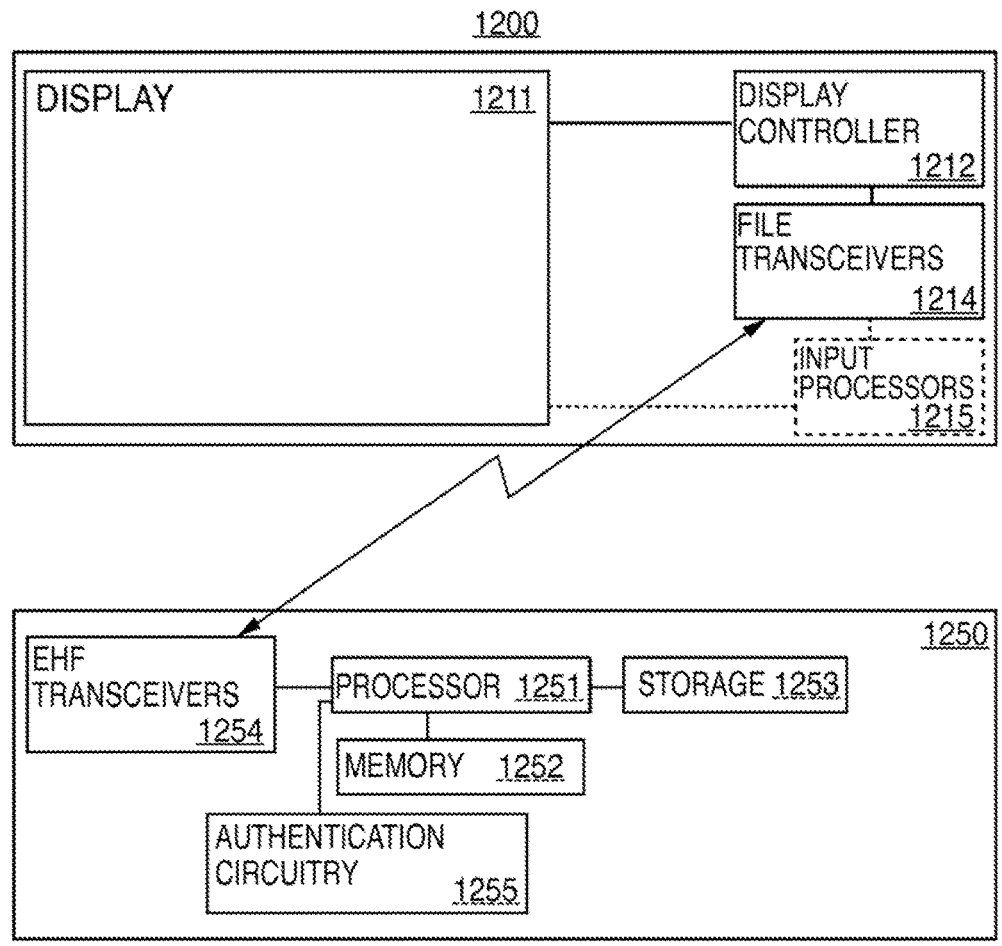
FIG. 12 shows an illustrative system including a contactless display apparatus and an active surface apparatus, according to some embodiments.

FIG. 12 shows an illustrative system 1200 including display apparatus 1210 and active surface apparatus 1250 according to an embodiment. Display apparatus 1210 can include display 1211, display controller 1212, EHF transceivers 1214, and optional input processor 1215. In some embodiments, display apparatus 1210 can include a power source such as a battery, power contacts for received power via wired connection, wireless energy capture circuitry for harnessing power being transmitted by active surface apparatus 1250, or a combination thereof (none of which are shown). Active surface apparatus 1250 can include processor 1251, memory 1252, storage 1253, EHF transceivers 1254, and authentication circuitry 1255. Active surface apparatus 1255 can include power contacts for transferring power via wired connection (not shown) or wireless power transfer circuitry (not shown) for transmitting power to display apparatus 1210. In some embodiments, active surface apparatus 1250 can be devoid of a display. In another embodiment, active surface apparatus 1250 can be devoid of user interface. In other embodiments, active surface apparatus 1250 can only be accessed via display apparatus 1210.

Display 1211 can be any suitable display for displaying media such as text, graphics, movies, etc. Display 1211 may be driven by display controller 1212, which can receive display data from EHF transceivers 1214. In some embodiments, input processor 1215 can be included for processing user inputs made on apparatus 1210. For example, input processor 1215 can process finger prints as part of two-factor authentication process. As another example, input processor 1215 can process touch inputs made on display 1211. As a further example, input processor 1215 can process facial or retina recognition features.

Processor 1251 can be any suitable processor. Memory 1252 can be any suitable volatile memory such as DRAM and storage can be any suitable non-volatile memory for storing data such as a hard-disk drive or Nand Flash. Authentication circuitry 1255 may be able to authenticate the credentials of apparatus 1210 interfacing with apparatus 1250.

Figure 13A:
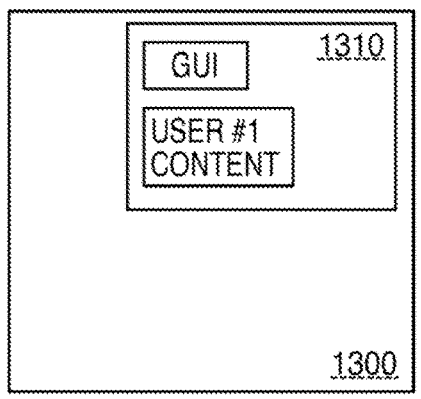
FIGS. 13A and 13B show different illustrative views of content being presented on a contactless display apparatus, according to some embodiments.
Figure 13B:
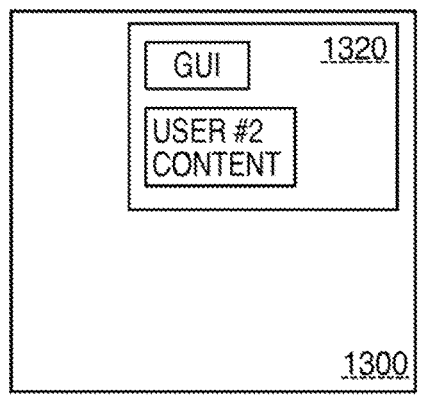

When apparatus 1210 is placed on active surface apparatus 1250, a close proximity coupling 1260 can be established between EHF transceivers 1214 and 1254. When coupling 1260 is established, data can be transmitted between apparatus 1210 and active surface apparatus 1250. In some embodiments, apparatus 1210 can be authenticated before any data is provided to apparatus 1210. Once authentication is complete, a user may be able to access data contained in active surface apparatus 1250 by interfacing with display 1211 of apparatus 1210. Referring now to FIGS. 13A and 13B, different illustrative views of content being presented on a display apparatus are shown.

FIG. 13A shows active surface apparatus 1300 on which display apparatus 1310 is placed. Display apparatus 1310 may be associated with a first user, and as a result, apparatus 1300 may supply content only available to the first user. FIG. 13B shows the same active surface apparatus 1300 of FIG. 13A, but a different display apparatus 1320 is placed thereon. Display apparatus 1320 may be associated with a second user, and as a result, apparatus 1300 may supply content only available to the second user.

Figure 14A:
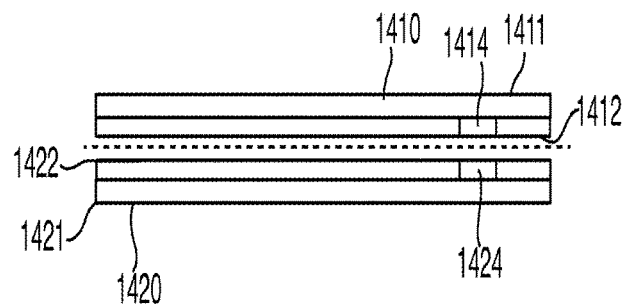
FIGS. 14A and 14B show illustrative cross-sectional views of contactless display apparatus being placed on an active surface apparatus, according to some embodiments.
Figure 14B:
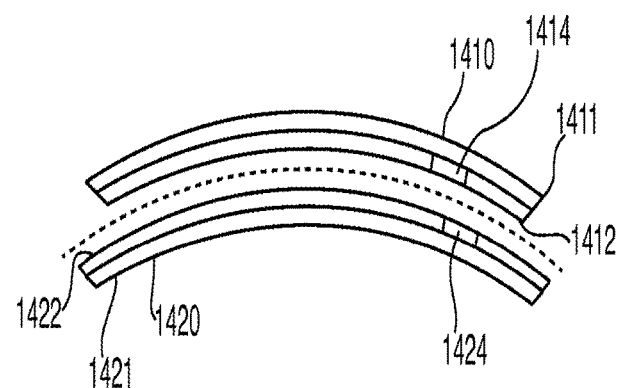

FIGS. 14A and 14B show illustrative cross-sectional views of display apparatus 1410 being placed on active surface apparatus 1420, according to some embodiments. Display apparatus 1410 may include, among other features, top layer 1411, bottom layer 1412, and EHF transceivers 1414. Transceiver 1414 may be sandwiched between layers 1411 and 1412. Active surface apparatus 1420 may include, among other features, top layer 1421, bottom layer 1422, and EHF transceivers 1424. Transceiver 1412 may be sandwiched between layers 1421 and 1422. Referring now specifically to FIG. 14A, active surface apparatus 1420 is shown to have a relatively flat surface. As a result, because display apparatus 1410 may be flexible, it too is shown to be relatively flat. When display apparatus 1410 is placed on active surface apparatus 1420, transceivers 1414 and 1424 are aligned. In contrast, in FIG. 14B, active surface apparatus 1420 has a curved surface. Display apparatus 1410 can mimic the curve of apparatus 1420 when it is placed thereon. Even with the curve, transceivers 1414 and 1424 can be sufficiently aligned to ensure a contactless connection is maintained.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. An electronic device, comprising:
a hinge having a rotational axis;
a first enclosure coupled to the hinge, the first enclosure comprising:
  a first waveguide having a first curved portion that is at least partially disposed along the rotational axis; and
  a first EHF transceiver operative to transmit or receive EHF signals to or from the first waveguide;
a second enclosure coupled to the hinge and operative to rotate about the rotational axis, the second enclosure comprising:
  a second waveguide having a second curved portion adapted to follow a contour of the first curved portion of the first waveguide as the second enclosure rotates about the rotational axis such that a first EHF coupling exists between the first and second waveguides via direct contact between the second curved portion and a portion of the first curved portion; and
  a second EHF transceiver operative to transmit or receive EHF signals to or from the second waveguide, wherein the first EHF coupling enables the first EHF transceiver to communicate EHF signals with the second EHF transceiver.

2. The electronic device of claim 1, wherein the first curved portion has a hook shape.

3. The electronic device of claim 1, wherein the second waveguide has a rectangular shape extending from the second curved portion.

4. The electronic device of claim 1, wherein the first waveguide has a rectangular shape extending from the first curved portion.

5. The electronic device of claim 1, wherein the first curved portion comprises a circular shape that partially surrounds an interior region, wherein the interior region is occupied by a material other than the second waveguide.

6. The electronic device of claim 1, wherein the first curved portion comprises a EHF interface that includes the portion that is in direct contact with the second curved portion.

7. The electronic device of claim 1, wherein the first and second waveguides are constructed from a plastic material.

8. The electronic device of claim 1, wherein the first waveguide is in physical contact with the second waveguide independent of the second enclosure's position with respect to the first enclosure.

9. The electronic device of claim 1, wherein the first enclosure further comprises:
  a third waveguide having a third curved portion that at partially surrounds the rotational axis; and
  a third EHF transceiver operative to transmit or receive EHF signals to or from the third waveguide; and
wherein the second enclosure further comprises:
  a fourth waveguide having a fourth curved portion adapted to follow a contour of the third curved portion of the third waveguide as the second enclosure rotates about the rotational axis such that a second EHF coupling exists between the third and fourth waveguides via direct contact between the fourth curved portion and a portion of the third curved portion of the third waveguide; and
  a fourth EHF transceiver operative to transmit or receive EHF signals to or from the fourth waveguide, wherein the second EHF coupling enables the third EHF transceiver to communicate EHF signals with the fourth EHF transceiver.

10. An electronic device comprising:
a first EHF transceiver operative to transmit or receive EHF signals;
a second EHF transceiver operative to transmit or receive EHF signals;
a hinge assembly associated with the first and second EHF transceivers and comprising first and second waveguides each having a circular portion, wherein the hinge assembly is operative to enable EHF signals to propagate between the first and second EHF transceivers via the hinge assembly when the first waveguide, which is associated with the first EHF transceiver, is in direct contact with the second waveguide, which is associated with the second EHF transceiver, such that when the first and second waveguides are in direct contact with each other, an EHF propagation coupling exists between the first and second waveguides, and when the first and second waveguides are not in direct contact with each other, the EHF propagation coupling does not exist.

11. The electronic device of claim 10, wherein the EHF propagation coupling enables EHF signals being transmitted by the first EHF transceiver to be received by the second EHF transceiver.

12. The electronic device of claim 10, wherein the circular portion of the first waveguide partially surrounds an interior region, wherein the interior region is occupied by a material other than the first waveguide.

13. The electronic device of claim 12, wherein the first waveguide comprises a rectangular portion, wherein EHF signals propagate through the rectangular portion and the circular portion.

14. The electronic device of claim 10, wherein the circular portion of the second waveguide partially surrounds an interior region, wherein the interior region is occupied by a material other than the first waveguide.

15. The electronic device of claim 14, wherein the second waveguide comprises a rectangular portion, wherein EHF signals propagate through the rectangular portion and the circular portion.

16. The electronic device 10, wherein the hinge assembly is a first hinge assembly, and the first and second EHF transceivers are a first coupled pair of EHF transceivers, the electronic device comprising:
  a second coupled pair of EHF transceivers comprising third and fourth EHF transceivers; and
  a second hinge assembly associated with the third and fourth EHF transceivers and comprising third and fourth waveguides each having a circular portion, wherein the second hinge assembly is operative to enable EHF signals to propagate between the third and fourth EHF transceivers via the second hinge assembly when the third waveguide, which is associated with the third ERE' transceiver, is in direct contact with the fourth waveguide, which is associated with the fourth EHF transceiver, such that when the third and fourth waveguides are in direct contact with each other, a second EHF propagation coupling exists between the third and fourth waveguides, and when the third and fourth waveguides are not in direct contact with each other, the second EHF propagation coupling does not exist.

* * * * *

UNITED STATES PATENT AND TRADEMARK OFFICE
CERTIFICATE OF CORRECTION

PATENT NO. : 10,082,995 B2
APPLICATION NO. : 15/642986
DATED : September 25, 2018
INVENTOR(S) : McCormack et al.

Page 1 of 1

It is certified that error appears in the above-identified patent and that said Letters Patent is hereby corrected as shown below:

In the Specification

Column 3, Line 52, delete "embodiments." and insert -- embodiments; --, therefor.

In the Claims

Column 20, Line 4, Claim 10, delete "device" and insert -- device, --, therefor.

Column 20, Line 43, Claim 16, delete "device" and insert -- device of claim --, therefor.

Column 20, Line 56, Claim 16, delete "ERE'" and insert -- EHF --, therefor.

Signed and Sealed this
Twelfth Day of May, 2020

Andrei Iancu
*Director of the United States Patent and Trademark Office*